(12) United States Patent
Yu et al.

(10) Patent No.: US 8,429,351 B1
(45) Date of Patent: Apr. 23, 2013

(54) TECHNIQUES FOR DETERMINING AN AMOUNT OF DATA TO PREFETCH

(75) Inventors: Rong Yu, Franklin, MA (US); Orit Levin-Michael, Irvine, CA (US); Roderick M. Klinger, Hopkinton, MA (US); Yechiel Yochai, Lincoln, RI (US); John W. Lefferts, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 1237 days.

(21) Appl. No.: 12/079,919

(22) Filed: Mar. 28, 2008

(51) Int. Cl.
*G06F 12/02* (2006.01)

(52) U.S. Cl.
USPC .................................. 711/132; 711/E12.004

(58) Field of Classification Search ........................ None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,260,115 B1 * | 7/2001 | Permut et al. | 711/134 |
| 6,807,619 B1 | 10/2004 | Ezra et al. | |
| 7,143,393 B1 | 11/2006 | Ezra et al. | |
| 7,392,340 B1 * | 6/2008 | Dang et al. | 711/111 |
| 2006/0090036 A1 * | 4/2006 | Zohar et al. | 711/133 |
| 2008/0229027 A1 * | 9/2008 | Shioya et al. | 711/137 |

OTHER PUBLICATIONS

U.S. Appl. No. 10/120,016, filed Apr. 10, 2002, Vishlitzky, et al.
U.S. Appl. No. 11/726,831, filed Mar. 23, 2007, Yochai.
U.S. Appl. No. 11/903,869, filed Sep. 25, 2007, Veprinsky, et al.
U.S. Appl. No. 12/004,300, filed Dec. 20, 2007, Yu, et al.
U.S. Appl. No. 12/079,939, filed Mar. 28, 2008, Yu, et al.

\* cited by examiner

*Primary Examiner* — Edward Dudek, Jr.
*Assistant Examiner* — Ryan Dare
(74) *Attorney, Agent, or Firm* — Muirhead and Saturnelli, LLC

(57) ABSTRACT

Described are techniques for processing a data operation in a data storage system. A front-end component receives the data operation to read a data portion. In response to receiving the data operation, the front-end component performs first processing. The first processing includes determining whether the data operation is a read operation resulting in a cache hit to a prefetched data portion of a sequential stream, and if said determining determines that said data operation results in a cache hit to a prefetched data portion, performing processing in connection with prefetching additional data for said sequential stream. The processing includes determining whether to prefetch additional data for said sequential stream and, if so, an amount of additional data to prefetch. The processing uses one or more criteria to determine one or more of an amount of data to prefetch in a single prefetch request and a track ahead parameter.

17 Claims, 19 Drawing Sheets

| Track | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| SSID 202 | ID1 | ID1 | ID1 | ID1 | ID1 | ID1 | ID1 | ID1 | | | | | | | | | | |
| POS 204 | 0 | 1 | 2 | 3 | 4 | 5 | 6 | 7 | | | | | | | | | | |
| REM PF 206 | - | - | 5 | 4 | 3 | 2 | 1 | 0 | | | | | | | | | | |
| AHEAD 208 | 3 | 3 | 3 | 3 | 3 | 3 | 3 | 3 | | | | | | | | | | |
| Amt to PF 210 | 6 | 6 | 6 | 6 | 6 | 6 | 6 | 6 | | | | | | | | | | |
| USED 212 | 0 | 0 | 0 | 0 | 0 | 0 | 0 | 0 | | | | | | | | | | |
| MISSED 214 | 0 | 0 | 0 | 0 | 0 | 0 | 0 | 0 | | | | | | | | | | |
| PF flag | 0 | 0 | 1 | 1 | 1 | 1 | 1 | 1 | | | | | | | | | | |

RM RM — PF REQ 1

1002: Amt to PF=6, Ahead =3, X = 4

FIG. 9

| Track | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| SSID 202 | ID1 | ID1 | ID1 | ID1 | ID1 | ID1 | ID1 | ID1 | ID1 | ID1 | ID1 | ID1 | ID1 | ID1 | | | | |
| POS 204 | 0 | 1 | 2 | 3 | 4 | 5 | 6 | 7 | 8 | 9 | 10 | 11 | 12 | 13 | | | | |
| REM PF 206 | - | - | 5 | 4 | 3 | 2 | 1 | 0 | 5 | 4 | 3 | 2 | 1 | 0 | | | | |
| AHEAD 208 | 3 | 3 | 3 | 3 | 3 | 3 | 3 | 3 | 3 | 3 | 3 | 3 | 3 | 3 | | | | |
| Amt to PF 210 | 6 | 6 | 6 | 6 | 6 | 6 | 6 | 6 | 6 | 6 | 6 | 6 | 6 | 6 | | | | |
| USED 212 | 0 | 0 | 0 | 0 | 0 | 0 | 0 | 0 | 4 | 4 | 4 | 4 | 4 | 4 | | | | |
| MISSED 214 | 0 | 0 | 0 | 0 | 0 | 0 | 0 | 0 | 0 | 0 | 0 | 0 | 0 | 0 | | | | |
| PF flag | 0 | 0 | 0 | 0 | 0 | 0 | 1 | 1 | 1 | 1 | 1 | 1 | 1 | 1 | | | | |
| TS | 0 | 0 | 0 | | | | | | | | | | | | | | | |

Amt to PF=6
Ahead =3
X = 4

FIG. 10

| Track | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
|  | RM | RM | RH | RH | RH | RH | RH | RH |  |  |  |  |  |  |  |  |  |  |
| SSID 202 | ID1 | ID1 | ID1 | ID1 | ID1 | ID1 | ID1 | ID1 | ID1 | ID1 | ID1 | ID1 | ID1 | ID1 |  |  |  |  |
| POS 204 | 0 | 1 | 2 | 3 | 4 | 5 | 6 | 7 | 8 | 9 | 10 | 11 | 12 | 13 |  |  |  |  |
| REM PF 206 | - | - | 5 | 4 | 3 | 2 | 1 | 0 | 5 | 4 | 3 | 2 | 1 | 0 |  |  |  |  |
| AHEAD 208 | 3 | 3 | 3 | 3 | 3 | 3 | 3 | 3 | 3 | 3 | 3 | 3 | 3 | 3 |  |  |  |  |
| Amt to PF 210 | 6 | 6 | 6 | 6 | 6 | 6 | 6 | 6 | 6 | 6 | 6 | 6 | 6 | 6 |  |  |  |  |
| USED 212 | 0 | 0 | 0 | 0 | 0 | 0 | 0 | 0 | 4 | 4 | 4 | 4 | 4 | 4 |  |  |  |  |
| MISSED 214 | 0 | 0 | 0 | 0 | 0 | 0 | 0 | 0 | 0 | 0 | 0 | 0 | 0 | 0 |  |  |  |  |
| PF flag | 0 | 0 | 0 | 0 | 0 | 0 | 0 | 0 | 1 | 1 | 1 | 1 | 1 | 1 |  |  |  |  |
| TS | 0 | 0 | 0 | 0 | 0 | 0 | 0 | 0 |  |  |  |  |  |  |  |  |  |  |

Amt to PF=6
Ahead =3
X = 4

PF REQ 1 (tracks 3–8), PF REQ 2 (tracks 9–14)

FIG. 11

TECHNIQUES FOR DETERMINING AN AMOUNT OF DATA TO PREFETCH

BACKGROUND

1. Technical Field

This application generally relates to data storage, and more particularly to techniques used in connection with data prefetching operations in a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

When a requester requests data from a disk, there may be considerable latency incurred in the process of retrieving the data from the disk. A cache memory, which is a relatively fast memory that is separate from the disks, may be used to address some of the latency issues associated with disks. The cache memory may contain recently fetched or requested data. Upon receiving a request for data, the data storage system first checks to see if the requested data is already in the cache memory. If so, the data storage system retrieves the data directly from the cache without having to access the disk and can avoid latencies and other delays associated with reading from a physical disk drive. Retrieving data which is already in cache allows the data to be returned to the requester in less time than if the data is not already in cache and is accessed on the disk.

In some cases, the data storage system may determine that the desired data is not in the cache memory but, instead, is on a disk. In this instance, the data storage system instructs a disk controller to retrieve the desired data from an appropriate track on a disk, store the retrieved data in cache, and return the retrieved data to the host. The foregoing is undesirable because such an operation is afflicted with latencies associated with mechanical motion within the disk drive and possible latencies associated with data transmission between the cache memory and the disk drive.

Different techniques may be used to populate the cache with data that the host or other requester is expected to request. A data storage system may perform data prefetching operations which prefetch data from a device and store the prefetched data in cache. Data prefetching relates to obtaining data from a device and storing the retrieved data in cache prior to receiving an actual request for the data, such as a request from a host. If data is not in cache when requested, the data may then be retrieved from the disk, stored in cache and returned to the host. Data prefetching techniques try to identify or recognize a pattern of I/O requests in a stream in order to try and predict what data will be requested next and prefetch data based on such prediction. One pattern is a sequential I/O stream. Data prefetching techniques may observe received I/O requests to try and identify a sequential I/O stream. A sequential I/O stream may be characterized as a sequence of I/O requests accessing data sequentially from the requester's point of view. A sequential I/O stream involves operating on one data portion, such as a track, immediately after the preceding one or more tracks of data in the stream. By identifying a usage pattern which is a sequential stream in connection with issued I/O requests, data prefetching techniques try and predict what data will be requested next and, accordingly, prefetch the data. For example, a data prefetching technique may observe a number of recently received I/O requests to try and identify a sequential I/O stream. If such a sequence is identified, the data prefetching technique may then obtain the next one or more data portions which are expected in the sequence prior to the data portions actually being requested.

Existing data prefetching implementations may have a problem recognizing sequential I/O streams due to the complexity of data storage configuration with multiple layers of logical device mappings in the data storage system, RAID striping, and the like. Not all of the information needed to recognize a sequential I/O stream may be available to the component in the data storage system performing the recognition and associated prefetch processing. In a data storage system such as by EMC Corporation, a backend disk adapter (DA) or director as included in a disk controller may read and write data to the physical devices. The DA may implement the data prefetching technique and perform processing to recognize a sequential I/O stream. The DA may only have access to information regarding the LV to physical device mappings and may otherwise not have access to information regarding other logical mappings and logical entities, as defined on the data storage system, which may be referenced in a host I/O request. As such, the DA may not be able to properly recognize a sequential I/O stream from the requester's (e.g., host's) point of view in order to trigger any appropriate prefetch processing. As an example, a data storage system may define a metavolume which consists of multiple LVs. The metavolume appears to the host as a single logical device that may be used in connection with the host's I/O requests. A host may issue I/O requests to consecutive tracks of data on the metavolume in which the consecutive tracks span two LVs. The foregoing may be a sequential I/O stream when evaluated across the two LVs in the context of the metavolume. However, the DA may not have knowledge regarding the metavolume and, thus, not recognize the foregoing sequential stream to trigger any appropriate prefetch processing.

Existing data prefetching techniques may also include inefficiencies. For example, in one existing implementation, the DA may maintain a list of information with an entry in the list for each I/O task the DA is servicing. In connection with determining whether to prefetch additional data subsequent to an initial prefetch, the DA may continuously evaluate each entry on the list to determine whether to perform additional prefetching for the associated task. Such polling of the list may be time consuming and reduce the amount of time and data storage system resources available to perform data prefetching.

As such, it may be desirable to utilize a data prefetching technique which provides for improved sequential stream recognition and is efficient in connection with maintaining information and using resources in connection with prefetch processing. It may also be desirable that such techniques be flexible and adjustable for use in connection with different sequential stream characteristics.

SUMMARY OF THE INVENTION

In accordance with one aspect of the invention is a method for processing a data operation in a data storage system comprising: receiving, by a front-end component of the data storage system, the data operation to read a data portion; and in response to receiving the data operation, performing first processing by the front-end component. The first processing includes: determining whether the data operation is a read operation resulting in a cache hit to a prefetched data portion of a sequential stream; and if said determining determines that said data operation is a read operation resulting in a cache hit to a prefetched data portion, performing processing in connection with prefetching additional data for said sequential stream. The processing includes determining whether to prefetch additional data for said sequential stream and, if so, an amount of additional data to prefetch. The processing includes using one or more criteria to determine one or more of an amount of data to prefetch in a single prefetch request and a track ahead parameter. The amount of data to prefetch and the track ahead parameter are associated with said sequential stream. The track ahead parameter indicates a number of data portions prefetch processing should remain ahead of requests to read data associated with the sequential stream. The one or more criteria may be used to select an initial value for one or more of said track ahead parameter and said amount of data to prefetch. The one or more criteria may be used to adjust one or more of said track ahead parameter and said amount of data to prefetch. The one or more criteria may include a size indicating an amount of data requested by said data operation. The one or more criteria may include a current length of said sequential stream. The one or more criteria may include a success ratio indicating a portion of prefetched tracks of said sequential stream which have been requested in connection with a data operation subsequent to being prefetched resulting in a cache hit. The one or more criteria may include a missed ratio indicating a portion of cache misses which have occurred with respect to a number of prefetched data portions in the sequential stream. The one or more of said track ahead parameter and said amount of data to prefetch may be upwardly adjusted in which each of said amount of data to prefetch and said track ahead parameter may be subject to an upper limit. The one or more criteria may include a size indicating an amount of data requested by said data operation and a success ratio indicating a portion of prefetched tracks of said sequential stream which have been requested in connection with a data operation subsequent to being prefetched resulting in a cache hit. One or more of said missed ratio, said size, and said success ratio may be used to determine whether to stop prefetching additional data for said sequential stream. The method may also include: determining a first value indicating whether at least one of a plurality of conditions is true, said plurality of conditions including: if said missed ratio is above a maximum value, if said size is above a maximum value, and if said success ratio is less than a specified value; determining a second value indicating whether one or more of said amount of data to prefetch and said track ahead parameter are at an upper limit; and if said first value indicates at least one of said plurality of conditions is true and said second value indicates that one or more of said amount of data to prefetch and said track ahead parameter are at an upper limit, the front end component terminates prefetching for said sequential stream. At least one of said amount of data to prefetch and said track ahead parameter may be increased in an amount proportional to a current length of said sequential stream. If a current length of said sequential stream is less than a minimum size, a fixed amount of data may be used when prefetching data. If the sequential stream is larger than the minimum size, one or more of said track ahead parameter and said amount of data to prefetch may be upwardly adjusted in accordance with said size. One or more of said track ahead parameter and said amount of data to prefetch may be increased or decreased in accordance with one or more defined ranges in which each of said one or more defined ranges may specify a range of values associated with one of said criteria. At least one of an upper limit and a lower limit may be specified for each of said track ahead parameter and said amount of data to prefetch. The track ahead parameter and said amount of data to prefetch may be determined using a function in which the function uses said one or more criteria in selecting and adjusting each of said amount of data to prefetch and said track ahead parameter. The one or more criteria may relate to configuration of said data storage system. At least one of an upper limit, a lower limit, and a default value associated with one of said track ahead parameter or said amount of data to prefetch may be determined in accordance with said one or more criteria. The sequential stream may have a first quality of service level, and said amount of data to prefetch may be selected in accordance with said missed ratio for the sequential stream, a measure of utilization for one or more resources of the data storage system, and a missed ratio associated with another activity having a second quality of service level indicating a higher service priority than said first quality of service level in which the sequential stream and said another activity share at least one resource in the data storage system. The another activity may be one of a plurality of activity types including another sequential stream.

In accordance with another aspect of the invention is a data storage system including a computer readable medium with code stored thereon for processing a data operation in the data storage system, the computer readable medium comprising code for: receiving, by a front-end component of the data storage system, the data operation to read a data portion; and in response to receiving the data operation, performing first processing by the front-end component, said first processing including: determining whether the data operation is a read operation resulting in a cache hit to a prefetched data portion of a sequential stream; and if said determining determines that said data operation is a read operation resulting in a cache hit to a prefetched data portion, performing processing in connection with prefetching additional data for said sequential stream, said processing including determining whether to prefetch additional data for said sequential stream and, if so, an amount of additional data to prefetch, said processing including using one or more criteria to determine one or more of an amount of data to prefetch in a single prefetch request and a track ahead parameter, said amount of data to prefetch and said track ahead parameter being associated with said sequential stream, said track ahead parameter indicating a number of data portions prefetch processing should remain ahead of requests to read data associated with the sequential stream.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9-11 illustrate an example updating and using information with the techniques herein for stream recognition and prefetch processing;

DETAILED DESCRIPTION OF EMBODIMENT(S)

Figure 1:
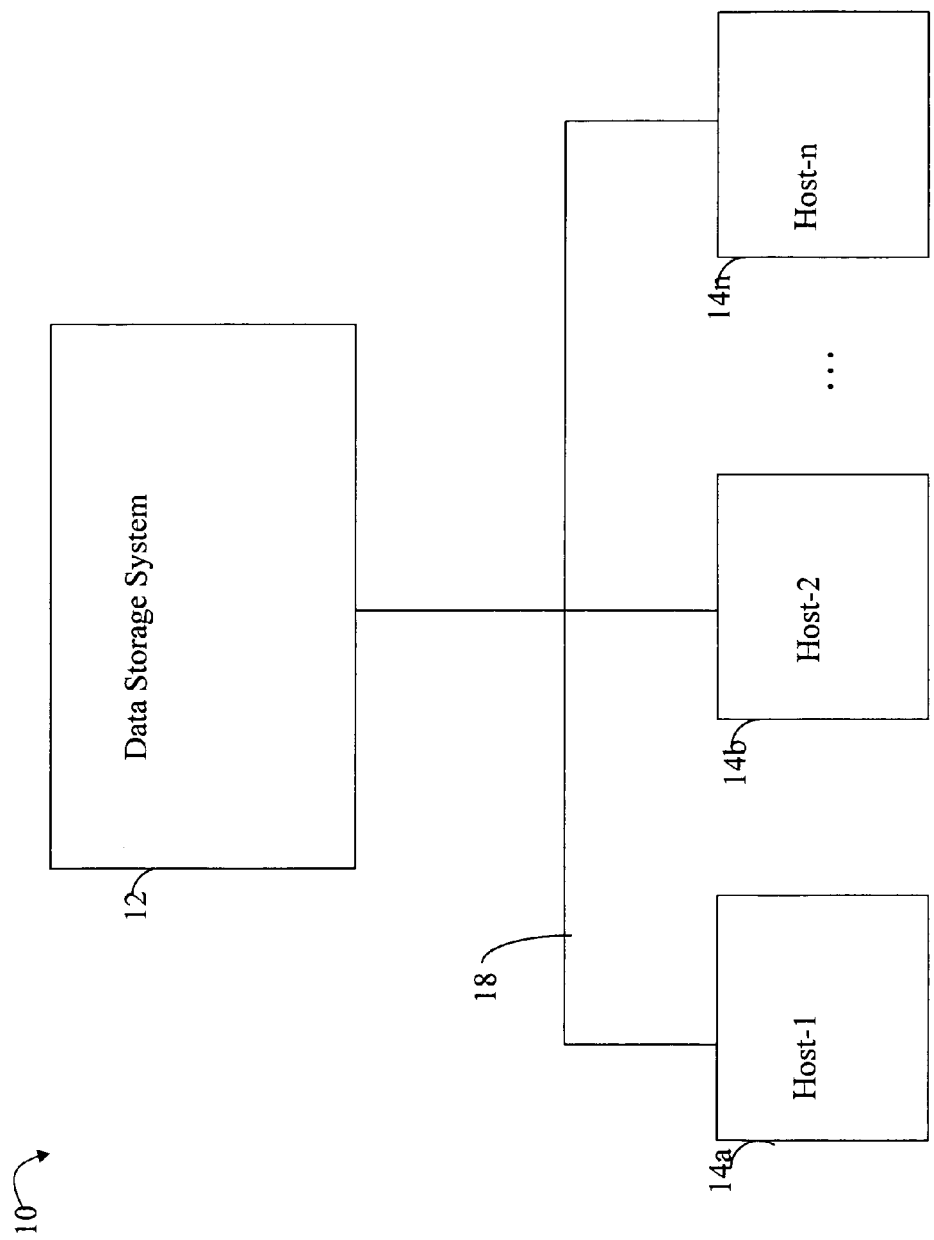
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
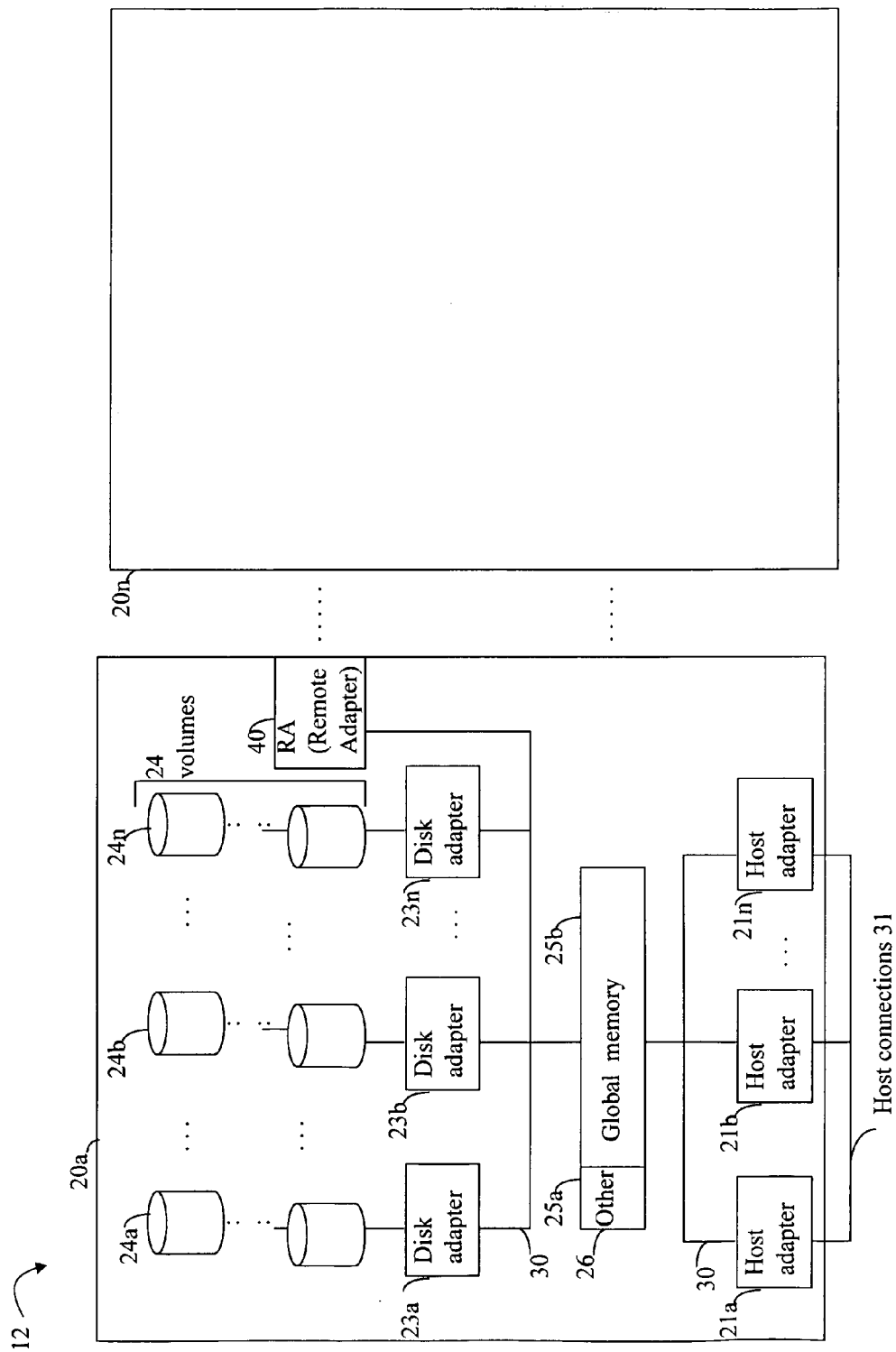
FIG. 2A is an example of an embodiment of a data storage system.

Referring to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate. Data may be accessed by LV in which a single DA manages data requests in connection with the different one or more LVs that may reside on a disk. The DA may accomplish this by creating job records for the different LVs associated with a particular DA. These different job records may be associated with the different LVs in a data structure stored and managed by each DA.

Figure 2B:
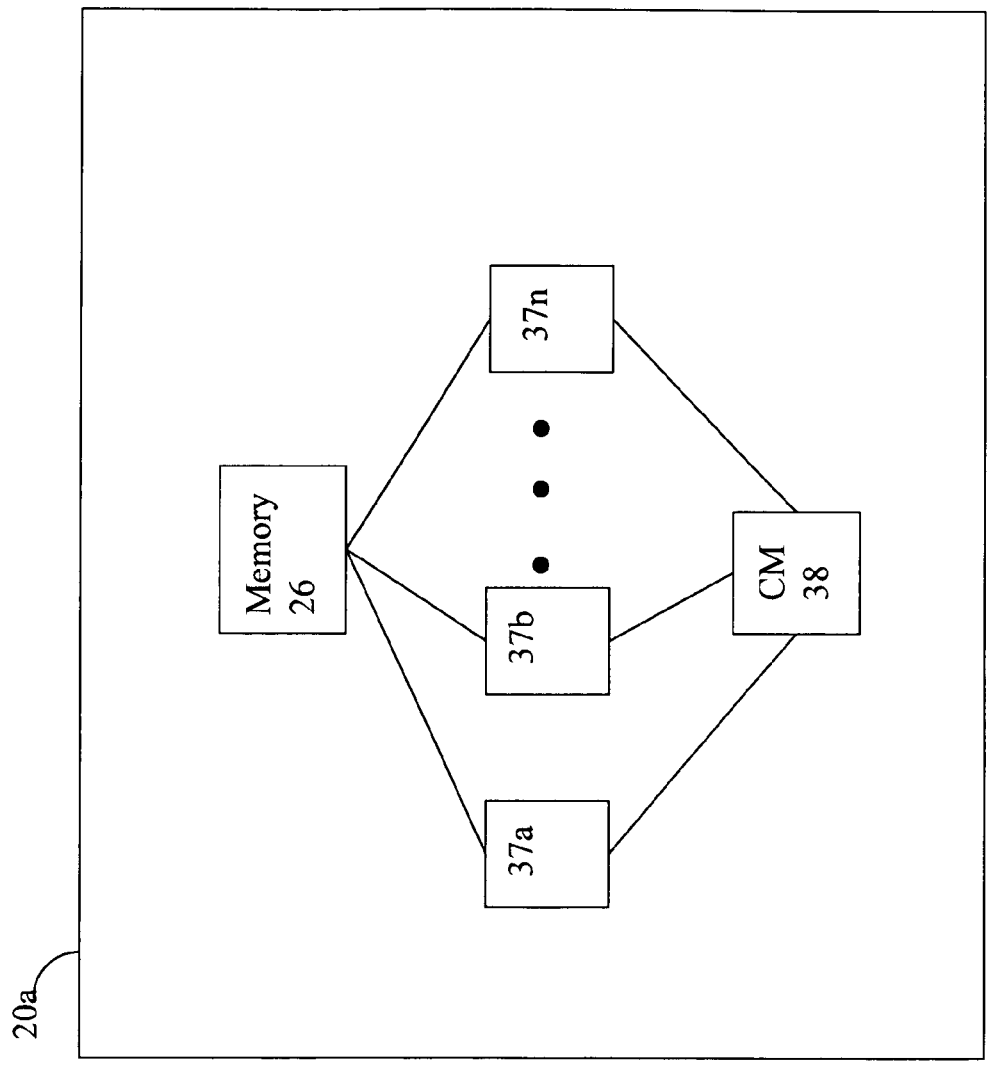
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to 64 directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 2A, components of the data storage system may communicate using GM 25b. For example, in connection with returning data to a host from one of the devices as part of a read operation, the data may be copied from the device by the appropriate DA servicing the device. The DA may copy the data read into a cache slot included in GM which is, in turn, communicated to the appropriate HA in communication with the host.

As described above, an embodiment may include a cache in the global memory portion 25b of FIG. 2. An embodiment may include any one of a variety of different caching data structures and management techniques. Examples of different types of cache arrangements are described, for example, in U.S. Pat. No. 6,807,619, Oct. 19, 2004, ADVANCING BANK POINTER IN PRIME NUMBERS UNIT, Ezra et al., and U.S. Pat. No. 7,143,393, Nov. 28, 2006, METHOD FOR CACHE MANAGEMENT FOR POSITIONING CACHE SLOT, Ezra et al., both of which are incorporated by reference herein. The foregoing are just some examples of cache arrangements that may be used in an embodiment with the techniques herein.

It should be noted that an embodiment may use different techniques in connection with data that is read from, or written to, devices in the data storage system. For example, the cache may be used in connection with processing data for read and write operations. In connection with a read operation, the DA may read the data requested from the device and store it in a cache slot included in cache. The cache slot is described in more detail elsewhere herein. The DA, for example, may obtain a cache slot if there is not already one allocated and associated with a particular data track. The data is read from the physical device by the DA and stored in the cache slot. Indicators associated with the cache slot and other structures may be appropriately updated in accordance with the data operation, the state of the data included in the cache slot, and the like. Data that is to be written to a device may be first stored in a cache slot and the cache slot may be appropriately updated (e.g., marked as a write pending by setting appropriate indicators of the cache slot and other data structures). The data is then actually written out to the physical device at a later point in time.

In connection with performing operations, such as in connection with an I/O operation for a device, a track id table which includes device information may be used.

Figure 3:
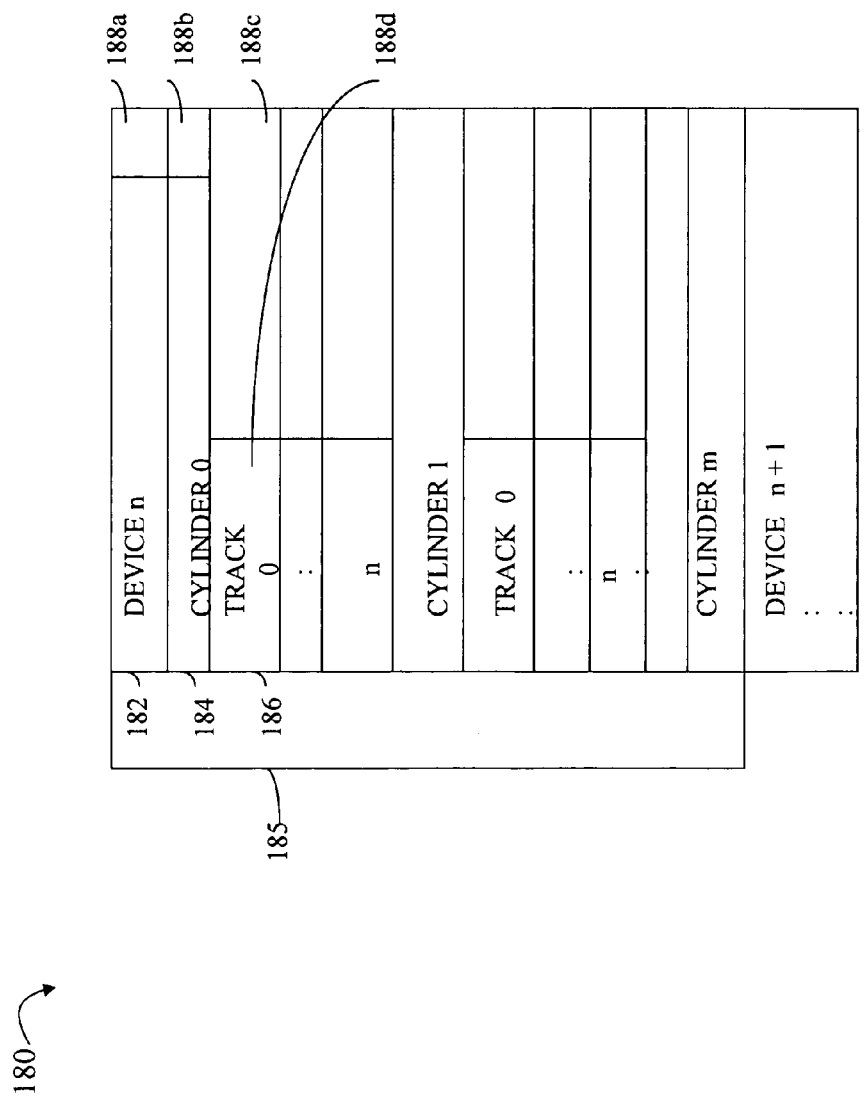
FIG. 3 is an example of an embodiment of a track id table.

Referring to FIG. 3, shown is an example of a representation of a track id table 180. The table 180 may be organized on a device-by-device level to indicate device state information for a particular portion of a device. Such information may include, for example, if the data from the portion is in cache, and if so, where in cache is it located. An embodiment that includes devices, for example, such as disks, may include a further refinement or granularity in the table 180 corresponding to a location in cache. The table 180 may also be used to store other information about each particular track as will be explained in more detail below. The table 180 may be stored as device metadata in a portion of GM as illustrated in other figures herein.

The table 180 may include a hierarchical structure relative to the structure of a disk, such as cylinders and tracks on a disk. In one embodiment, a track may be a 64K byte portion aligned with the beginning of the device and a cylinder may be 15 tracks. Other embodiments may use different structures and/or sizes. Each device, such as device n, may have a corresponding portion 185 included in the table. Each of the portions 185 may further be divided into sections in accordance with the disk structure. A portion 185 may include device header information 182, information for each cylinder 184, and for each track within each cylinder 186. For a device, a bit indicator 188a may indicate whether data associated with the device is stored in cache. The bit indicator 188b may further indicate for a particular cylinder within a device, is any data stored in the cache. Associated with each track may be a corresponding portion 188c which may include information about a particular track. In one embodiment, portion 188c may indicate whether data associated with a particular track is in the cache and an associated address of where in the cache the data for a particular track may be found, for example, in connection with performing a read operation or a pending write operation. The portion 188c may include other information associated with a particular track, such as a valid cache address if data is stored in the cache for the particular track. The portion 188c may also include one or more bit flag indicators and other information related to each device track. The bit flags may include a bit indicator as to whether the track is associated with a cache slot (e.g., "in-cache flag"). The portion 188c may also include a bit flag or indicator as to whether the data in the cache slot has been prefetched (e.g., "prefetch indicator"). As described in more detail in following paragraphs, a cache slot may include a header portion and a data portion. For each track associated with a cache slot, information may be included in the header portion of the cache slot indicating what portions data for the track, if any, are actually included in the data portion of the cache slot. In other words, a cache slot may be associated with a track as indicated by the in-cache flag. For the cache slot associated with the track, some, none or all of the data for the track may actually be stored in the cache slot data portion. In one embodiment, the cache slot header may include a bitmap indicating what portions, if any, of data for the associated track are actually stored in the cache slot data portion. In one embodiment, the cache slot data portion may be 64K bytes. The cache slot data portion may be partitioned into 128 pieces or segments (e.g., each piece may correspond to a size or minimum amount of data read from a device). The bitmap indicator may include 128 bits, one bit for each piece, in which the bit for a piece is set when the corresponding data for the piece is in cache. The prefetch indicator, in-cache flag, and bitmap indicator may be used in connection with performing prefetch processing as described in following paragraphs. In particular, the in-cache flag may be examined to determine whether there is a cache slot associated with a track. If so, the particular data of the track which is actually stored in the cache slot data portion may be determined by examining the bitmap indicator of the cache slot header. The in-cache flag and bitmap indicator may be used in connection with determining what data for a read request is in cache. The prefetch indicator may be used in connection with other processing as described in more detail below.

If all the data associated with a read operation is in cache, the read operation may be described as resulting in a cache hit. Otherwise, the read operation may be described as resulting in a cache miss since the read operation cannot be serviced by retrieving all data from the cache. Additional data for the read operation resulting in a cache miss is read from disk to service the read operation. For purposes of the processing and techniques herein, a read operation may be evaluated to determine which one or more tracks of requested data, or portions thereof, are in cache. What will now be described are several conditions or trigger events that may be used in an embodiment in connection with the techniques and processing herein. Such conditions or trigger events may be described in accordance with evaluating whether data of a read operation is in cache.

It should be noted that a request to read data, as may be received from a host by the FA, may be a request to read a single track of data, a portion of a single track of data (e.g., request for less than a single track of data), or data spanning multiple tracks (e.g., request for more than a single track of data or a request for portions of data from multiple tracks). The FA may perform processing to determine whether all the data for the read request is in cache. In one embodiment as described herein, this may be determined by examining the appropriate in-cache flag(s) and bitmap indicator(s) for the one or more tracks of the read request. If all of the data needed to service the read request is not in cache, there is a READ MISS. Otherwise, if all the data needed to service the read request is in cache, there is a READ HIT. Processing that may be performed by the FA in connection with determination of a READ MISS and READ HIT are described in more detail in following paragraphs.

Figure 3A:
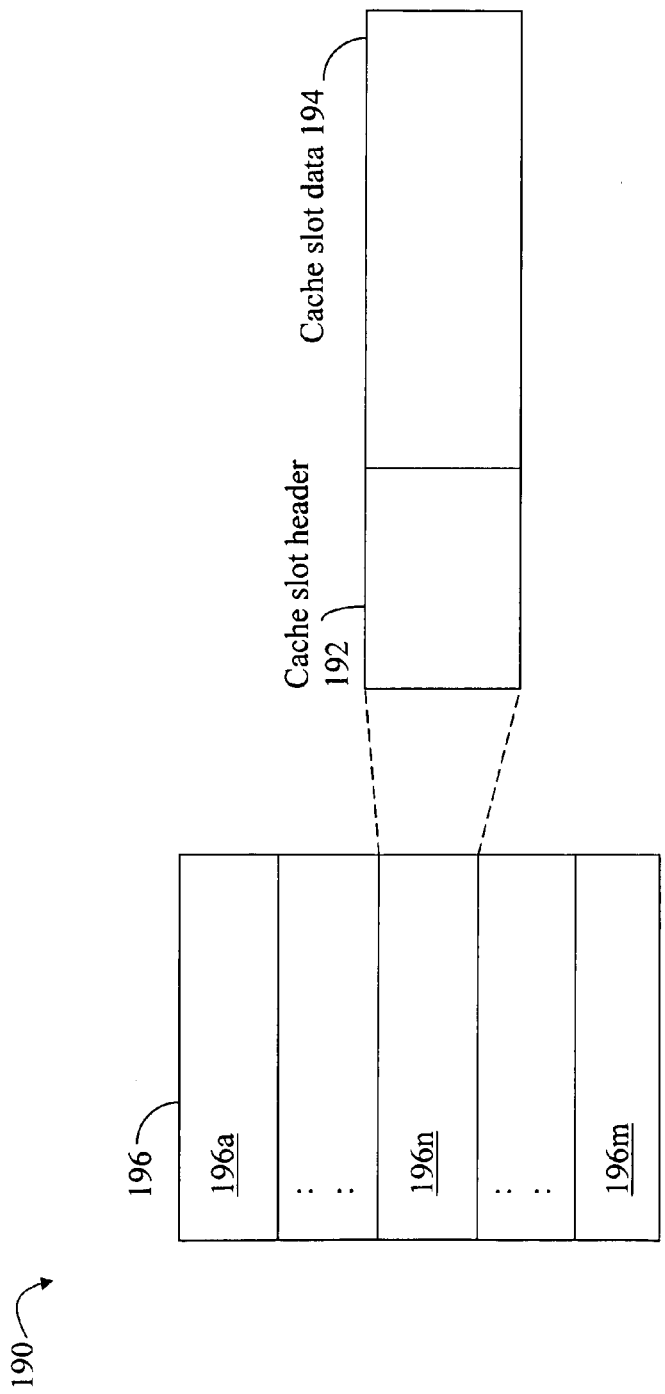
FIG. 3A is an example representation of portions of a cache slot.

Referring to FIG. 3A, shown is an example of a logical representation of a cache including cache slots. The example 190 includes a cache 196 with a plurality of cache slots 196a-196m. It should be noted that the cache 196 may be characterized as a logical representation of the cache since any one of a variety of different arrangements and data structures may be used in an embodiment. Element 196n shows additional detail regarding a cache slot. A cache slot 196n may include a header portion 192 and a data portion 194. The cache slot header 192 may include one or more pieces of information used in connection with cache management. The cache slot data portion 194 may include the cached data, for example, such as a track of data stored in the cache in connection with an I/O operation. The cache slot header 192 may include one or more bit flags or indicators (e.g., such as the bitmap indicator described above) as well as other information as will be described in more detail herein. Such other information may be used in connection with performing prefetch processing as described in following paragraphs. It should be noted that for purposes of illustration, detail of only a single cache slot 196n is shown. However, the other cache slots are similarly arranged.

Different techniques may be used to populate the cache with data that the host or other requester is expected to request. A data storage system may perform data prefetching operations which prefetch data from a device and store the prefetched data in cache. Data prefetching relates to obtaining data from a device and storing the retrieved data in cache prior to receiving an actual request for the data, such as a request from a host. Thus, prefetched data which is stored in cache and then requested by the host provides the requested data to the host with a shorter response time than if no prefetching had been performed. Data which is prefetched may be stored in a data portion of a cache slot as described herein. If data is not in cache when requested, the data may then be retrieved from the disk, stored in cache, and returned to the host. Data prefetching techniques try to identify patterns of I/O requests in a stream in order to try and predict what data will be requested next and prefetch data based on such a prediction. One pattern is a sequential I/O stream. Data prefetching techniques may observe received I/O requests to try and identify a sequential I/O stream. A sequential I/O stream may be characterized as a sequence of I/O requests accessing data sequentially from the requester's point of view. A sequential I/O stream involves operating on one data portion, such as a track, immediately after the preceding one or more tracks of data in the stream. By identifying a sequential stream in connection with issued I/O requests, data prefetching techniques try and predict what data will be requested next and, accordingly, prefetch the data. For example, a data prefetching technique may observe a number of recently received I/O requests to try and identify a sequential I/O stream. If such a sequence is identified, the data prefetching technique may then obtain the next one or more data portions which are expected in the sequence prior to the data portions actually being requested. In one embodiment as described in more detail in following paragraphs, a sequential I/O stream is detected by determining whether data tracks of the sequential I/O stream are in cache via examination of the appropriate in-cache bit flags in the track id table entries and the bitmap indicators for the data tracks. Other embodiments may use other techniques in connection with detection of a sequential I/O stream.

In connection with data prefetching, data which the host is expected to request next is brought into cache prior to being requested so that such data may be available in a more timely fashion rather than waiting until the data is requested and, in response to the request, obtaining the data from the device and storing it in cache. Furthermore, as will be described in more detail herein, techniques may be used in connection with retaining in cache that data which the host will most likely reuse. In connection with a sequential stream, cut processing techniques are described herein that may be used in an embodiment to limit the amount of data of a sequential stream which remains in cache since, once a prefetched track of data in cache has been requested by the host, the chance is low that the host will request the same track of prefetched data in the sequential stream within a relatively small amount of time. Thus, cut processing may be used to limit the amount of cache used to store prefetched data for a sequential stream.

Existing data prefetching implementations may have a problem recognizing sequential I/O streams due to the complexity of data storage configuration with multiple layers of logical device mappings in the data storage system, RAID striping, and the like. Not all of the information needed to recognize a sequential I/O stream may be available to the component in the data storage system performing the recognition and associated prefetch processing. In a data storage system such as by EMC Corporation, the backend disk adapter (DA) or director as included in a disk controller may read and write data to the physical devices. The DA may implement the data prefetching technique and perform processing to recognize a sequential I/O stream. The DA may only have access to information regarding the LV to physical device mappings and may otherwise not have access to information regarding other logical mappings and logical entities, as defined on the data storage system, which may be referenced in a host I/O request. As such, the DA may not be able to properly recognize a sequential I/O stream from the requester's (e.g., host's) point of view in order to trigger any appropriate prefetch processing. As an example, a data storage system may define a metavolume which consists of multiple LVs. The metavolume appears to the host as a single logical device that may be used in connection with the host's I/O requests. A host may issue I/O requests to consecutive tracks of data on the metavolume in which the consecutive tracks span two or more LVs. The foregoing may be a sequential I/O stream when evaluated across the two or more LVs in the context of the metavolume. However, the DA may not have knowledge regarding the metavolume and, thus, not recognize the foregoing sequential stream to trigger any appropriate prefetch processing.

As such, what will now be described is an embodiment using the techniques herein in which the FA performs processing in connection with sequential I/O stream recognition and prefetching. In connection with the techniques herein, the FA plays an increased role in sequential I/O stream recognition and prefetch processing while also limiting the adverse impact on other FA activities such as, for example, read hit response time and I/O throughput.

It should be noted that the FA may be referred to in connection with illustrative examples of the techniques herein. However, an embodiment may include another type of front end component of the data storage system besides the FA which interfaces with the host (e.g., such as receiving host I/O requests) for use with the techniques herein.

As described herein, the data storage system may provide a first mapping layer which maps one or more physical storage devices or drives, or portions thereof, to each LV or logical device. The data storage system may also provide additional mapping layers which are used to define other logical devices or entities which may be presented to the host for use. These additional mapping layers may map one or more LVs to other logical entities or devices. As an example, the data storage system may provide a second additional mapping layer which maps multiple LVs, or portions thereof, to another second level logical device or volume. The second level logical device may be presented to the host as a single host device or host volume consisting of multiple LVs, or portions from multiple LVs.

A regular device may be defined as a logical device or volume which, from the host's point of view, is associated with only a single LV and utilizes only the first mapping layer on the data storage system. In other words, I/O requests received from a host which are in terms of LV and location(s) within the LV (e.g., offset) refer to a regular device or regular volume. If a logical device or volume referenced in an I/O request from the host is not a regular device or volume, then the logical device or volume is characterized as non-regular. A non-regular device or volume may be defined as a logical device or volume which utilizes another mapping layer other than the forgoing first mapping layer (e.g., mapping between LVs and physical devices or drives).

It should be noted that, for purposes of illustration, the foregoing provides an example of a non-regular device which uses the first mapping layer and only a second additional mapping layer. However, an embodiment may use more than two mapping layers on the data storage system in connection with non-regular devices.

Examples of a non-regular device or volume may include a metavolume which is a concatenation of multiple LVs to form the single metavolume that looks to the host like a single LV. Other examples of non-regular devices or volumes are virtual devices, and thin devices. Virtual devices are described in more detail in U.S. patent application Ser. No. 10/120,016, filed Apr. 10, 2002, VIRTUAL STORAGE DEVICES, Vishlitsky, et al, which is incorporated by reference herein. Thin devices are described in more detail in U.S. patent application Ser. No. 11/726,831, filed Mar. 23, 2007, AUTOMATED INFORMATION LIFE-CYCLE MANAGEMENT WITH THIN PROVISIONING, Yochai, and U.S. patent application Ser. No. 11/903,869, filed Sep. 25, 2007, DATA DE-DUPLICATION USING THIN PROVISIONING, Veprinsky et al., both of which are incorporated by reference herein.

In one embodiment of a data storage system as described herein, the DA may have access to information regarding the foregoing first mapping layer for the LV to physical device mapping. Information regarding any additional logical device mappings (i.e., such as mapping LVs to/from other logical entities for virtual devices, metavolumes, thin devices) may not be available to the DA even though the additional logical devices may be presented and used by the host in connection with I/O requests. As an example in which the non-regular device in a host I/O request is a metavolume as described above, information regarding the metavolume is not available to the DA. As such, a DA is able to map I/O requests for regular devices or volumes back to the host's device point of view (e.g. to the device or volume referenced in the I/O request received from the host). However, the DA is not able to map I/O requests for the non-regular device which is a metavolume back to the host's device point of view.

Because information regarding the non-regular devices is not available to the DA, the DA is not able to recognize sequential streams for a non-regular device. Information regarding the additional mappings and logical devices as used in connection with non-regular devices may be available for use by the FA or other front end director which communicates with the host and receives I/O requests. As such, the FA has access to the information needed to perform sequential stream recognition and prefetch processing for both regular and non-regular devices as set forth in detail below.

As described above, the FA may be characterized as a front end director of the data storage system. The DA may be characterized as a back end director of the data storage system. In connection with the techniques herein described in following paragraphs, the FA performs processing to recognize sequential I/O streams. The sequence can be of any fixed or varying length determined in accordance with any one of a variety of different techniques. For example, the FA may look for a sequential stream of length 3. If such a sequential stream is initially determined by the FA, prefetch processing may be performed. Any amount of data may be prefetched as determined using any one of a variety of different techniques. In the embodiment described in following paragraphs, the FA performs sequential stream recognition processing by determining if one or more tracks associated with the sequential stream are currently in cache.

In connection with examples set forth in following paragraphs for purposes of illustration of the techniques herein, reference may be made to a read request involving a single track of data, or portion thereof. However, it should be noted that a read request may be made for more than a single track of data, or for data included in more than one track.

Figure 4:
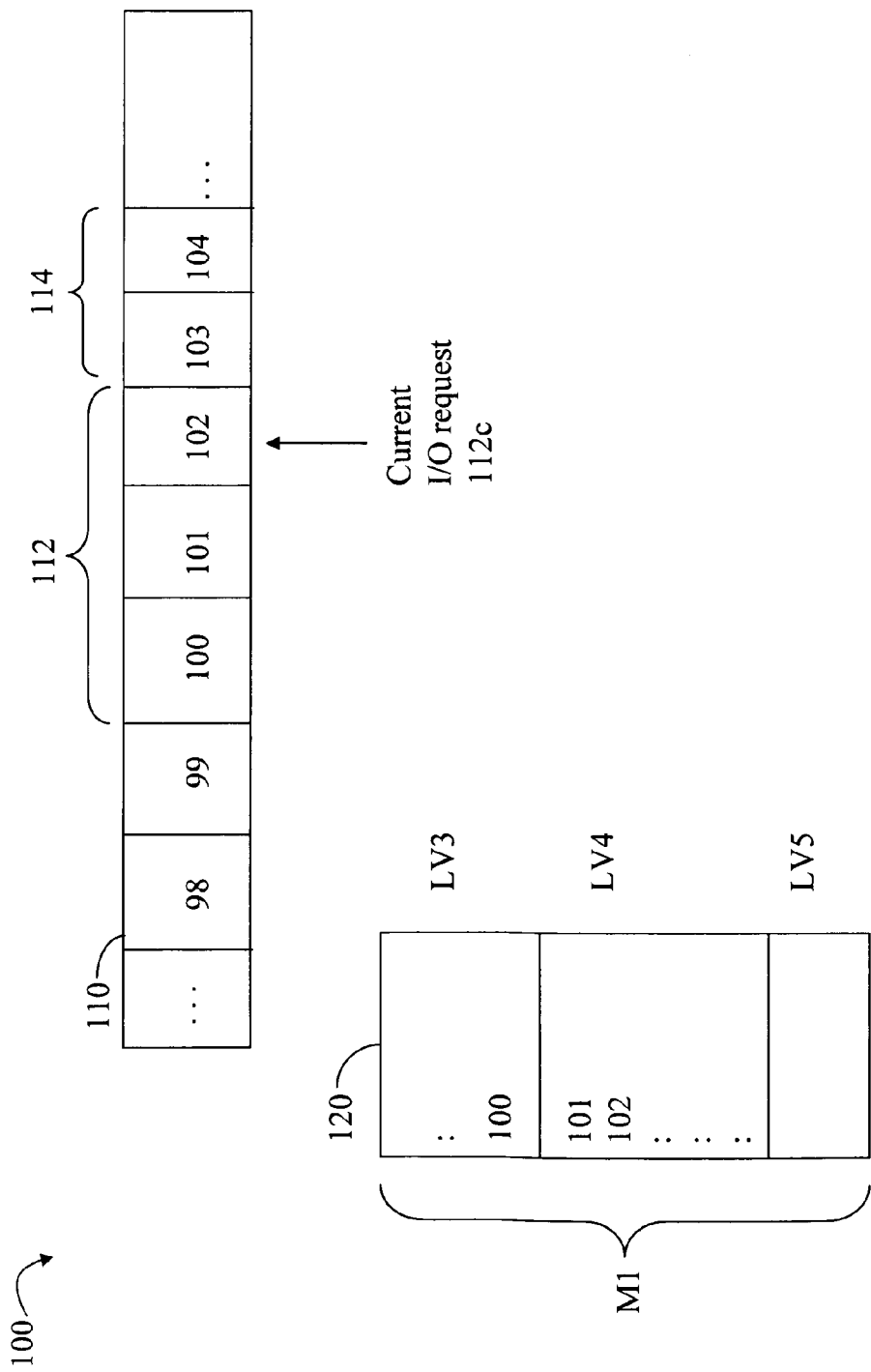
FIG. 4 is an example illustrating use of the techniques herein in connection with sequential stream recognition and prefetch processing.

Referring to FIG. 4, shown is an example illustrating use of the techniques herein as may be performed by the FA in connection with sequential stream recognition and prefetch processing. The example 100 includes a representation 110 of consecutive tracks of data included in a defined metavolume M1. The FA may perform processing to recognize a sequential stream. As an example, a current I/O request for track 102 may be received by the FA resulting in a READ MISS. As a result, the data for the current I/O request needs to be read from the physical device. Prior to reading track 102, the FA may perform sequential stream recognition processing to determine if a sequential I/O stream triggering prefetching exists. If a sequential I/O stream is detected, then additional data tracks besides track 102 may be read from the device. For purposes of illustration, the FA may be looking for sequential streams of 3 data portions. In this example, a data portion may be a track of data although data portion units other than tracks may be used and sequence sizes other than 3 may be used. When an I/O request to read data is received, the FA may look at the current track for the current I/O request and make a determination as to whether the two preceding tracks are in cache. The FA may make this determination by examining information maintained in an embodiment such as the in-cache flag associated with each track of the track id table and bitmap indicator for each cache slot. If the two preceding tracks are in cache, the FA may determine that a sequential stream has been detected.

With reference to FIG. 4, when the current I/O request 112c is received and results in a READ MISS, the FA performs processing to determine if a sequential stream exists by making a determination as to whether tracks 100 and 101 of metavolume M1 are in cache. In this example, tracks 100 and 101 are in cache and element 112 represents the sequential stream detected by the FA. Otherwise, if one or more of tracks 100 and 101 are not in cache, no sequential stream is detected and the FA instructs the DA to obtain the data for the read operation which is not currently in cache causing the READ MISS and store the data in cache. If a sequential stream is recognized, the FA may instruct the DA to retrieve the READ MISS data and prefetch additional data as described in more detail elsewhere herein. As a variation to the foregoing, an embodiment may look for sequences of 2 data portions rather than 3. In such an embodiment, the FA's sequential stream recognition processing determines whether the single preceding track is in cache and, if so, recognizes a sequence of length 2. It should be noted that the size of the sequence, whether the sequence is a fixed or variable size, and the like, may vary with embodiment.

As illustrated by 120, metavolume M1 may consist of three different LVs—LV3, LV4 and LV5. Information regarding the metavolume may be stored in a table (i.e., included in device metadata) of defined metavolumes. The FA may use the foregoing metadata information when performing processing to recognize sequential I/O streams. Information, such as that regarding the defined metavolumes, may not be available to the DA but is available for use by the FA. As such, the FA is able to recognize 112 as a sequential I/O stream even though it spans multiple LVs. Metavolume M1 may be as described herein which is, from the host's viewpoint, a single logical entity (e.g., device or volume) for which the host can issue requests. The host may issue I/O requests with respect to the metavolume M1 rather than the 3 LVs included therein. In other words, M1 may be visible to the host, but not the individual 3 LVs comprising M1. In order to properly recognize sequential streams, information regarding M1 is available and used by the FA.

When performing READ MISS processing for a read request spanning more than one track, the sequential stream recognition processing (e.g., looking back at a number of previous one or more data tracks and determining whether such one or more data tracks are in cache) may be performed with respect to the first track of the read request data.

Once a sequential I/O stream has been recognized by the FA in response to detecting a READ MISS, prefetch processing of the next one or more tracks of data in the sequence may be performed. This may be the first or initial portion of data prefetched for the recognized sequence. The amount of data prefetched may vary and be determined using any one of a variety of different techniques. For example, an embodiment may always prefetch a fixed number of tracks or may vary the number of tracks prefetched in accordance with a heuristic. Different techniques that may be used in an embodiment in connection with determining an amount of data to prefetch are described elsewhere herein. The particular information that may be used in connection with making such a determination and techniques for maintaining such information in cache slot headers are also described herein. With reference to the example illustrated in FIG. 4, 2 tracks of data may be prefetched as represented by element 114.

In connection with prefetching the first or initial portion of data upon recognizing a sequential stream as described above, the FA may instruct the DA regarding what one or more tracks of data, or portions thereof, to obtain (e.g., data to read from disks or drives), what information to write to the cache slot headers associated with the one or more tracks, and what information to write to the track id table. More specifically, the FA may instruct the DA to obtain the data causing the READ MISS (e.g., data which is currently not in cache and needed to service the current read request) and subsequent data in the recognized sequence to be prefetched. As part of the processing, the DA may also obtain the cache slots and perform any updating of the cache slots to include the data stored therein. The FA may also instruct the DA to store additional information to each of the cache slot headers. Such information may be used, for example, in connection with making a determination as to whether to perform additional prefetching at a later point in time. The FA may also instruct the DA to update the track id table entry for each prefetched track of data by setting the prefetch indicator associated with each prefetched track of data. Note that in one embodiment, the FA may not need to instruct the DA to set the in-cache flags in the track id table or otherwise set the bitmap indicators in any cache slot headers since the DA may update this information as part of normal DA processing when retrieving data from a disk and storing the retrieved data in a cache slot. The information that may be stored in the cache slot headers associated with data identified as being part of a sequential stream is described in more detail in following paragraphs. Furthermore, techniques for management of the sequential stream data in cache as well as management of the information in the cache slots headers associated with the data of the sequential stream are also set forth in following paragraphs. It should be noted that upon the occurrence of a READ MISS, the recognition of a sequential stream may also include determining whether the READ MISS operation is associated with a new sequential stream as well as an existing sequential stream, as will be described in more detail below in connection with the techniques described herein.

At a later point in time after receiving the READ MISS, recognizing a sequential stream and prefetching one or more data tracks, there may be a READ HIT to one of the prefetched tracks of data. The FA may perform processing to determine whether there is a READ HIT in connection with a received read operation. As described herein in one embodiment, such a READ HIT determination may be made by examining the appropriate in-cache flag of each one or more appropriate track id table entries and, for each track having an associated cache slot, the bitmap indicator of the header for the associated cache slot. If the FA detects a READ HIT, the FA may perform processing with respect to one or more tracks associated with the READ HIT. For a READ HIT associated with only a single track, the FA makes a determination as to whether there has been a READ HIT to a prefetched track by determining whether the prefetch indicator associated with the track is on or set. In response to determining a READ HIT to a prefetched data track, the FA may perform additional prefetch processing. This additional prefetch processing includes setting the prefetch flag in the appropriate track id table entry off or to false. Note that this affects subsequent READ HITS to the same track in that the prefetch indicator will now be false. The additional prefetch processing, as described in more detail in following paragraphs, may also relate to management of the cache where the FA may perform processing to allow cache slots including data from a sequential stream to be marked as candidates for reuse and compute additional values that may be used in determining an amount of additional data to prefetch. The additional prefetch processing may also include steps to prefetch additional tracks of data related to the sequential I/O stream including the track of the READ HIT. In one embodiment in response to determining a READ HIT to a prefetched data track, one or more additional tracks of data (e.g., the next tracks in the sequence) may be prefetched. The number of tracks prefetched may be a fixed number of tracks, or other variable number that may vary in accordance with sequential stream characteristics. In one embodiment, a determination regarding whether to prefetch any additional data and the amount of data to prefetch may be made without using any information from the cache header. In an embodiment, information related to the sequence or sequential I/O stream may be included in the cache slot header associated with the cache slot experiencing the READ HIT. This information stored in the cache slot header may be used to determine whether to prefetch any data at all. Additionally, if data is to be prefetched, the information in the cache slot may also be used to determine how much data to prefetch. Information may include counters related to the sequential I/O stream, position of the cache slot in the recognized sequence, and the like. It should be noted that whether any information is stored in the cache slot header and how that information may be used varies with each embodiment. As mentioned above, information that may be stored in cache slot headers and use of such information in connection with prefetch processing in an embodiment is set forth in more detail below.

If the READ HIT is associated with a read request spanning multiple tracks from a starting track to an ending track, the foregoing just described and elsewhere herein for a single track READ HIT may be performed for each track commencing with the starting track. Such per track processing may be performed until the occurrence of either the ending track is processed, or processing of one of the multiple tracks results in additional data being prefetched. For example, if a READ HIT occurs for a read request reading tracks 1, 2, and 3, the prefetch indicator of track 1 is examined. If the prefetch indicator of track 1 is currently on, the prefetch indicator of track 1 is turned off and processing is performed to determine whether to prefetch additional data. If additional data is prefetched, no additional prefetch processing is performed for tracks 2 and 3. However, if the prefetch indicator of track 1 is currently off or no additional data is prefetched, the prefetch indicator of track 2 is examined. If the prefetch indicator of track 2 is currently on, the prefetch indicator of track 2 is turned off and processing is performed to determine whether to prefetch additional data. If additional data is prefetched, no additional prefetch processing is performed for track 3. However, if the prefetch indicator of track 2 is currently off or no additional data is prefetched, the prefetch indicator of track 3 is examined. If the prefetch indicator of track 3 is currently on, the prefetch indicator of track 3 is turned off and processing is performed to determine whether to prefetch additional data. If the prefetch indicator of track 3 is currently off, no additional data is prefetched and no further prefetch processing is performed since there are no additional tracks associated with the READ HIT.

It should be noted that other techniques may be used in an embodiment in connection with processing I/O operations spanning multiple tracks.

In one embodiment, the amount of data prefetched upon the detection of READ HIT to a data track with the prefetch indicator set may vary with the position of the READ HIT data track in the recognized sequence as well as other information. Information regarding the position of the READ HIT data track, as well as the other information, may be stored in the cache header of a prefetched slot. The information may include a sequence number relating to the position of the READ HIT data track in the recognized sequence. The FA may instruct the DA to store a sequence number, along with other information as described in more detail in following paragraphs, to a cache slot header of each track of prefetched data as part of the processing described above in connection with prefetching when a sequential stream has been recognized.

What will now be described is information that may be stored in cache slot headers associated with data of a sequential stream. Such information may be used in an embodiment in management of the sequential stream, determining what data is prefetched when a sequential stream is recognized, and what additional data, if any, is prefetched based upon a READ HIT to a previously prefetched data track. Such information may also be used to determine when a new stream begins, whether a received I/O operation is part of an existing stream as well as in connection with management of the data stored in cache for a sequential stream.

As described above, in one embodiment, information used to manage a sequential stream may be stored in cache slot headers of cache slots holding the data of the sequential stream.

Figure 5:
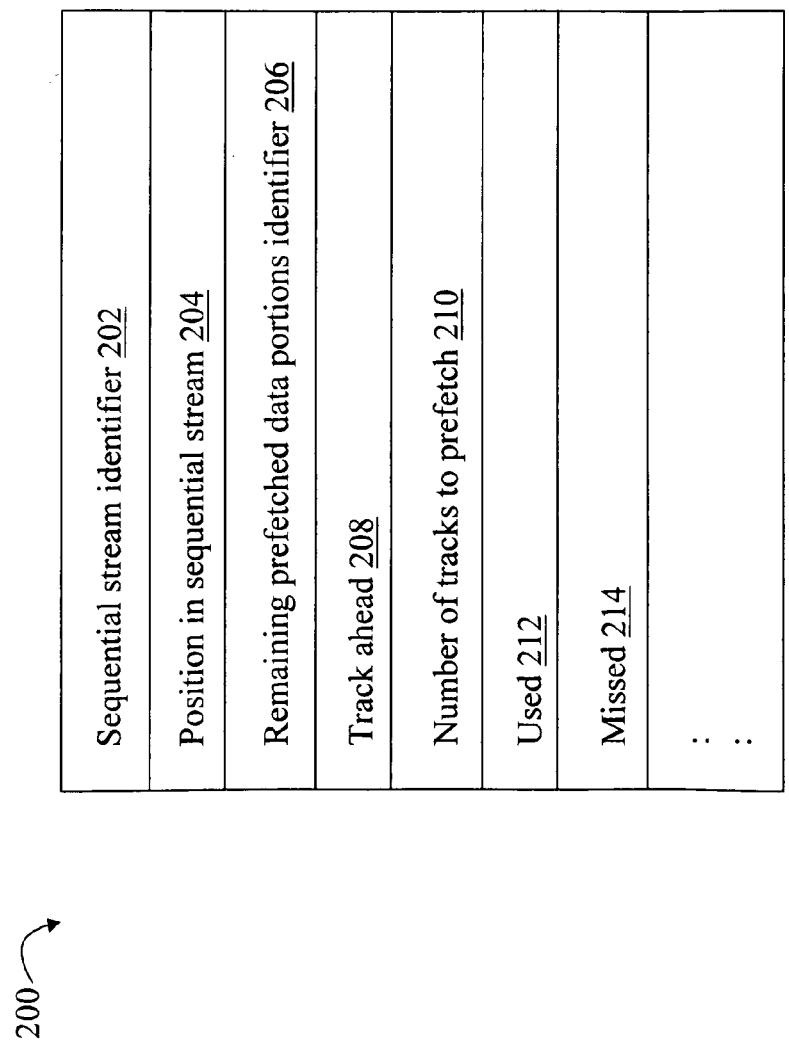
FIG. 5 is an example representation of information that may be included in a cache slot header in an embodiment using the techniques herein.

Referring to FIG. 5, shown is an example representation of information that may be stored in a cache slot header for use in management of a sequential stream in an embodiment utilizing techniques described herein. The example 200 represents in detail fields of information that may be included in the cache slot header 192 of FIG. 3A. The cache slot header may include a sequential stream identifier 202, a position in sequential stream 204, a remaining prefetched data portions identifier 206, track ahead 208, a number of tracks to prefetch 210, a used counter 212, and missed counter 214. Each of the foregoing will now be described.

The sequential stream identifier (SSID) 202 may be an identifier used to identify a particular sequential I/O stream. In one embodiment, the SSID 202 may be formed by concatenating a two-byte device number and a two-byte time value. The device number may refer to the device number or device identifier from the host's point of view used to differentiate between different devices that may be accessed, for example, by a host. The time may be a time value expressed in milliseconds used to differentiate between multiple streams in operation at the same time which are associated with the same device. For example, a host may have two applications executing thereon in which each application is accessing data on the same device. Each application may have its own sequential stream that is identified based on the combination of device number and time value forming the SSID of each stream.

In one embodiment, the time value may be obtained using a system maintained on the data storage system. The time value included in 202 may be the last 4 digits or 2 bytes of the system time in milliseconds. The time value may be obtained at the start of a detected sequence, such as when the FA recognizes a new sequential stream upon the occurrence of a READ MISS. The time value may be obtained using other sources as may be available in an embodiment in order to sufficiently distinguish between streams to a same device. The FA may use the sequential stream identifier of a cache slot header to determine whether a received I/O operation is part of an existing sequential stream, or whether the received I/O operation is part of a new sequential stream. In one embodiment, a READ MISS may occur and the FA may perform sequential stream recognition processing as described above. Once a sequential stream has been recognized, the FA may determine a first SSID associated with the received I/O operation causing the READ MISS. The FA may obtain a value from the cache slot header for the data track preceding the first track of the received I/O operation. The value may be at the location in the cache slot header at which a valid SSID is expected. The FA may compare the first SSID to the value retrieved from the cache slot header of the preceding data track. If the device numbers match and the time values are within some defined time threshold (e.g., a number of seconds or milliseconds), the FA may determine that the received I/O is part of the I/O stream associated with the preceding data track. Otherwise, the FA may determine that the received I/O operation is associated with a new I/O stream. If the FA determines that the received I/O operation is not a new stream (e.g., is rather a continuation of an existing stream associated with the preceding track), the FA may instruct the DA to include the SSID associated with the preceding track in each of the one or more cache slot headers associated with data of the received I/O operation and any prefetched data. Otherwise, if the FA determines that the received I/O operation is associated with a new I/O stream, the FA may instruct the DA to include an SSID associated with the new stream, such as the SSID of the received I/O operation, in each of the one or more cache slot headers associated with data of the received I/O operation and any prefetched data. It should be noted that an embodiment may also use other criteria and conditions in connection with making a determination as to whether there is a new stream or continuation of an existing sequential stream.

The position in the sequential stream 204 may identify, with respect to the data track stored in the cache slot with the cache slot header 200, the current length of the sequential stream and may also identify a position of the data track in the sequential stream. As described in more detail elsewhere herein, the position in sequential stream 204 may be used to manage the number of data portions of the sequential stream maintained in cache. The position in sequential stream 204 may also be used in connection with determining how much data to prefetch upon the occurrence of a READ HIT associated with a prefetched data track. The FA tells the DA what value for 204 is to be placed in each cache slot header for each cache slot containing prefetched data. If the FA determines that a received I/O operation is a continuation of an existing stream, the FA instructs the DA to include a value for 204 in each of the one or more cache slot headers associated with data of the received I/O operation and any prefetched data based on the value of 204 of the preceding track. In particular, the FA instructs the DA to include in each such cache slot header field 204 a next position in the sequential stream. Otherwise, if the FA determines that a received I/O operation is associated with a new stream, the FA instructs the DA to place a value in field 204 of each such cache slot header of retrieved data based on a new sequential stream.

In one embodiment, each data track associated with the read operation causing the READ MISS may be assigned a position in the sequential stream with the first track associated with the read operation having the first number in the sequence and each subsequent track of data associated with the READ MISS, prefetched data, and subsequent data tracks in the stream being sequentially numbered thereafter. In another embodiment, the values for the position in the sequential stream may start with the tracks preceding the READ MISS which are in cache. In this case, the position numbers in the sequential stream are assigned starting with the one or more tracks preceding the READ MISS, data of the READ MISS, and subsequent data tracks in the stream being sequentially numbered thereafter. In yet another embodiment, each data track associated with the read operation causing the READ MISS may be not be assigned a position in the sequential stream. As an alternative in this latter other embodiment, the first number in the sequence may be assigned to the first track of prefetched data with any subsequent tracks in the sequence being sequentially numbered thereafter. The sequence of numbers for the position in sequential stream 204 may be zero-based (e.g., begins with 0) or one-based (e.g., begins with 1). When a new sequential stream is detected, the position in sequential stream 204 assigned to the first track in the stream is the first number in the sequence (e.g., 0 if zero-based and 1 if one-based), with subsequent tracks of data in the stream assigned position numbers thereafter.

In one embodiment, there may be a maximum number or value associated with the position in sequential stream 204. Such a maximum may be due to storage limitations in the cache slot header. For example, in one embodiment, there may be 8 bits allocated for use to represent the possible range of values for field 204. In such an embodiment, no value larger than 255 may be stored in the cache slot header even if sequences may be longer than 256 elements. As such, an embodiment may use a technique to wrap around or cycle values of field 204 when the sequential stream contains a number of elements exceeding an allowed maximum. For example, in an embodiment having no value in field 204 larger than 255, when the positioning sequential stream 204 reaches 256, processing may be performed to map 256 to a different value. When the value of 204 reaches the maximum (e.g., 256), the value of 204 may be mapped to "(maximum/ 2)" (e.g., 128 when the maximum is 256). Subsequent values of 204 may be incremented from this mapped value (e.g., 128) until the maximum (e.g., 256) is again reached and then may also be remapped. In an embodiment with a maximum value of 256, the foregoing describes a process and defines a numbering sequence of 0 . . . 255, 128 . . . 255, 128 . . . 255 . . . for consecutive values of the position in sequential stream 204 that may be assigned to consecutive tracks of data in a sequential stream. The foregoing is one example of a mapping function and size constraint that may be applicable to an embodiment using the techniques herein. The foregoing mapping may be performed by the FA in connection with determining values for 204 to be stored in a cache slot header. The foregoing values for 204 may be communicated from the FA to the DA in connection with instructing the DA to retrieve data from a disk drive, store the data in cache and updating the cache slot header associated with the retrieved data.

The remaining prefetched data portions identifier 206 may indicate the number of prefetched data portions remaining with respect to a prefetched chunk of one or more data portions. The data included in the cache slot associated with the header may be one data portion included in a chunk of prefetched data portions retrieved from disk when the FA instructs the DA to prefetch a number of data tracks. The identifier 206 represents a location or distance from the last data track in the prefetched chunk. As described in more detail elsewhere herein, the identifier 206 may be used in connection with determining when to prefetch additional data upon the occurrence of a READ HIT to a cache slot including prefetched data.

It should be noted that the value of the identifier 206 may be used by the FA and DA in connection with processing. The value of 206 may be used by the FA to decide from what location to begin prefetching additional data and may result in the creation of identical prefetch requests having the same starting location (e.g., track) and length (e.g., amount of data to prefetch). As an example, there may be two prefetch requests (due to two read hits to two slots in the same previously prefetched "chunk") issued from the FA to the DA. Each request may be based on a different value of 206 yet both requests have the same starting location (e.g., track) and length. Based on the foregoing same information of each request, the two prefetch requests can be identified by the DA as duplicates and merged into a single prefetch request. The value of 206 may also be used in connection with managing the number of cache slots containing data associated with a sequential stream as described elsewhere herein.

In connection with processing performed by the FA, the FA may instruct the DA to store particular values for 202, 204 and 206 in cache slots holding data which the FA also instructs the DA to retrieve. The particular values of 202, 204 and 206 may vary depending on the sequential stream, whether the data retrieved by the DA as instructed by the FA is the start of a new sequential stream, and the amount of data prefetched.

The track ahead 208 is a value indicating how many tracks prefetch processing should remain ahead of the host while the host is reading data associated with the sequential stream. For example, a track ahead 208 value of 3 means that we would like processing to remain three tracks ahead of the host. The track ahead 208 may be used in determining when to prefetch additional data for a sequential stream in connection with a READ HIT to a prefetched data track. For example, 5 tracks of data may be prefetched in a first prefetched chunk in addition to data associated with a READ MISS. With a track ahead value of 3, when the first of the 5 prefetched tracks in the prefetched chunk experiences a READ HIT, there are still 4 prefetched tracks which the host has yet to request in the sequential stream. As such, there is no need to prefetch additional data upon the occurrence of the READ HIT to the first track of the prefetched chunk since prefetch processing is still 4 tracks ahead of the host. Additional data may be prefetched, for example, when there is a READ HIT to the last of the tracks in the prefetched chunk. The track ahead 208 may be selected and modified for each recognized sequential stream. The track ahead 208 may also be modified from an initial value associated with a sequential stream. The track ahead 208 may be tuned in accordance with characteristics of each sequential stream, host activity, data storage system processing capabilities and current processing rates, and the like. Particular techniques that may be used in an embodiment in selection and tuning of track ahead 208 values are described in more detail in following paragraphs.

The number of tracks to prefetch 210 indicates a number of tracks that are prefetched at a time when the FA instructs the DA to perform a prefetch. The value in 210 indicates the number of tracks prefetched at a point in time, for example, when the FA instructs the DA to prefetch data when a sequential stream is recognized after the occurrence of a READ MISS, or to prefetch additional data upon the occurrence of a READ HIT to a prefetched track. As with the track ahead 208, the number of tracks to prefetch 210 may be selected and modified for each recognized sequential stream. The value of 210 may also be modified from an initial value associated with a sequential stream. The value of 210 may be tuned in accordance with characteristics of each sequential stream, host activity, data storage system processing capabilities and current processing rates, and the like. For example, the value of 210 may be increased in accordance with the size of the read operation. As the I/O size increases, the amount of data prefetched as indicated by 210 may also be increased. If a long sequence of a particular length is detected (e.g., as indicated by the position in sequential stream 204), an embodiment may increase the number of tracks prefetched. As the sequence gets longer, the number of tracks prefetched as indicated by 210 may also increase. Particular techniques that may be used in an embodiment in selection and tuning of number of tracks to prefetch 210 are described in more detail in following paragraphs.

It should be noted that an embodiment may use a value for 208 which is larger than, or equal to, a value for 210. In such cases, provided that processing has determined that there is a need to prefetch additional data (e.g., if 206<208 as described elsewhere herein), each read hit to a track of prefetched data may result in issuing a request to prefetch additional data. Values may be selected for 208 and 210 based upon a relationship between 208 and 210. For example, a value selected for 208 may be equal to a value selected for 210, or a value selected for 208 may be a multiple of a value selected for 210 (e.g., value of 208=2*(value of 210)). When there is a READ HIT to a prefetched track of data included in a previously prefetched chunk of data and a value of 208 is greater than a value of 210, the determination regarding what data to prefetch upon the occurrence of the READ HIT to the prefetched track may be made with respect to the first track of the prefetched "chunk" including the prefetched track experiencing the READ HIT. In this case, the value of 204, position in sequential stream, associated with the last track of the next additional data chunk to prefetch may be determined by adding (the value of 208)−1 to the value of 204 associated with the first track of the prefetched chunk including the READ HIT. An embodiment may also make such a determination with respect to the last track of the prefetched chunk including the prefetched track experiencing the READ HIT.

The number used 212 may represent a number of prefetched data tracks which have been associated with a READ HIT indicating that the host has subsequently requested the prefetched data. In other words, the number used 212 may represent the number of prefetched data tracks in a sequential stream which have subsequently experienced a READ HIT since being prefetched. The number missed 214 may represent a number of cache misses that have occurred with respect to data in the sequential stream. In one embodiment, the number missed 214 may represent the a number of misses that have occurred with respect to a sequential stream since prefetching has commenced. There are various ways in which an embodiment may determine values for 212 and 214, some of which are described in more detail in following paragraphs. Values for both the number used 212 and the number missed 214 stored in a cache slot header may be communicated from the FA to the DA. The number used 212 may be determined by the FA and/or DA in accordance with particular cut processing technique used in an embodiment as described elsewhere herein in more detail. The number missed 214 may be determined by the FA and/or DA in connection with the types of misses that may occur. The fields used 212 and missed 214 are described in more detail in following paragraphs and may be used in connection with assessing the condition of prefetch processing. It should be noted that in one embodiment, the values stored in 212 and 214 may be an integer quantity and may have meaning relative to the current size of the sequence as indicated by position in sequence number 204. In such an embodiment, the values in 212 and 214 may be adjusted in accordance with any mapping performed when the value of 204 reaches a maximum. The values of 212 and 214 may be similarly mapped as the value in 204 so that represent quantities which are similarly scaled downward by the mapping. As described above, when 204 reaches the maximum value, the maximum value is mapped to "(maximum/2)". When the value in 204 is so mapped, the values in 212 and 214 may also be mapped (e.g., divided by 2).

Figure 6:
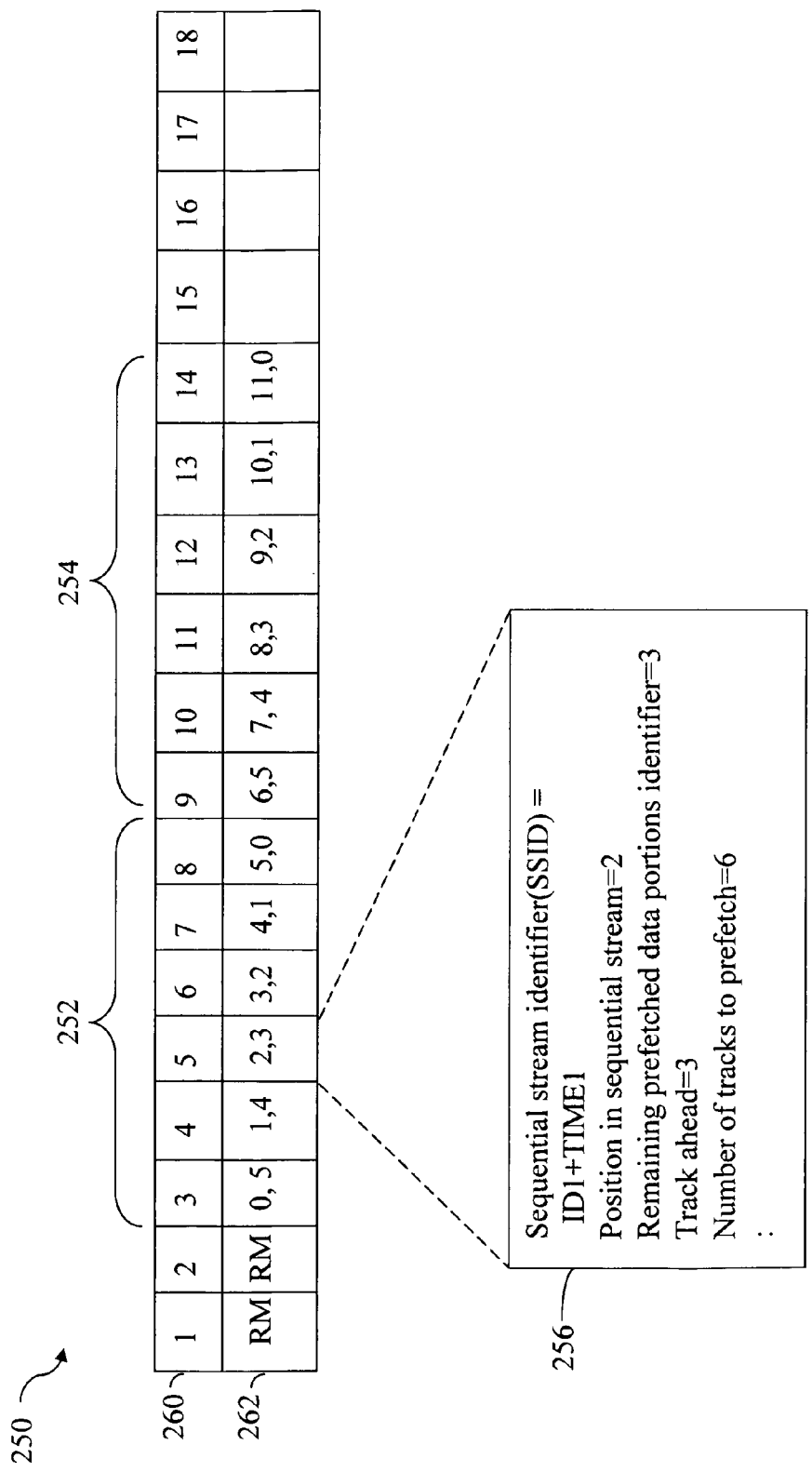
FIGS. 6 and 7 are examples illustrating use of techniques herein.

Referring to FIG. 6, shown is an example illustrating assignment of position in sequential stream values (e.g., values of 204) and remaining prefetched data portion values (e.g., values of 206) to data tracks in a sequential stream over time. For the example 250, the following may be associated with the sequential stream: number of tracks to prefetch 210 may be 6, and track ahead may be 3. Row 260 indicates a track number and row 262 indicates a pair of values associated with each track. The values of row 262 may be determined by the FA and communicated from the FA to the DA in the message exchanged when the FA instructs the DA to fetch data as will now be described. Row 262 includes pairs of values associated with tracks 3 through 14, inclusively. Each pair of values associated with a track includes a first value, which is the position in sequential stream 204, and a second value, which is the remaining prefetch data portions 206, associated with the track. The "RM" in entries of row 262 associated with tracks 1 and 2 indicate a READ MISS in connection with processing described in following paragraphs. It should be noted that the number used and missed are omitted at this time for simplicity from this example but are described in connection with other examples.

Examples described herein, such as in FIG. 6, may make reference to a sequential stream having values for field 204 commence with the first track of prefetched data although an embodiment may associate the starting position number for 204 with the first track of the READ MISS, or tracks preceding the READ MISS data operation as examined in sequential stream recognition processing.

It should be noted that in an embodiment in which the values for the position in sequential stream 204 start with the data causing the READ MISS, or tracks preceding the READ MISS data examined as part of recognition processing, the FA may determine appropriate values for the cache slot headers associated with the data tracks and instruct the DA to update accordingly.

Read requests may be received by the FA from a host starting with track 1 resulting in a READ MISS. The DA may retrieve the data of track 1 and store it in cache. Track 2 may be requested. As described above, the FA may determine that this is a READ MISS and recognize a sequential stream since the single previous track, track 1, is in cache. In this example, the FA looks back one track in connection with sequential stream recognition processing. The FA determines that data in connection with the detected stream is to be retrieved. The FA also determines in connection with this example that this is the start of a new sequential stream. The contents of the cache slot header associated with track 1 does not include a valid SSID. Thus, comparison of a the SSID field for track 1 to a second SSID determined for the currently received I/O operation request for track 2 results in a determination of a new sequential stream (e.g., second SSID does not have same device as indicated in previous track's SSID field, and second SSID does not have a time component which is within threshold value as indicated in previous track's SSID field). At a first point in time, the FA may instruct the DA to retrieve the data causing the READ MISS (e.g., track 2) and to also prefetch an additional chunk of data 252 in the sequential stream. In one embodiment, the values for track ahead=3 and tracks to prefetch=6 may be default values, configurable values or otherwise determined by the FA using techniques described elsewhere herein. The FA may instruct the DA to store the foregoing values for track ahead=3 and tracks to prefetch=6 in the cache slots headers associated with the prefetched data. In connection with the FA's instructions at the first point in time as described above, the FA may instruct the DA to retrieve track 2, prefetch 6 tracks of data as indicated by 252, and to store values as indicated by corresponding entries in 262 in the cache slot headers associated with the prefetched 6 tracks of 252. Additionally, the FA may instruct the DA to store the values of track ahead=3 and tracks to prefetch=6 in each of the cache slot headers associated with the prefetched 6 tracks of 252. The FA may instruct the DA to store the SSID associated with the READ MISS to track 2 in cache slot headers for track 2 and each of the prefetched tracks of 252. The FA may also instruct the DA to set the prefetch indicators of track id table entries for tracks 3-8 to ON.

Continuing with the illustration of FIG. 6, the host may then issue requests for data of the prefetched tracks 3-8 causing a READ HIT. What will now be described is how the track ahead value 208 may be used in connection with determining whether to prefetch additional data in connection with a READ HIT to a prefetched track. The host issues a single read request for tracks 3, 4, and 5. The FA determines a READ HIT and examines information stored in the track id table and cache slot headers for each of tracks 3, 4, and 5. In connection with track 3, the FA determines that the prefetch indicator is ON and makes a further determination as to whether to prefetch additional data for the sequential stream using information included in the cache slot header of track 3. In one embodiment, the FA may make this decision using the track ahead value=3 and the remaining prefetched data portions value=5 stored in the cache slot header for track 3. Using the foregoing values from the cache slot header of track 3, the FA makes a determination that there is no need to prefetch additional data if the remaining prefetched data portions (e.g., 5) is greater than the value of track ahead (e.g., 3). The FA makes a similar determination with respect to track 4 using data from the track id table (e.g., prefetch indicator for track 4) and cache slot header associated with track 4. Upon reaching track 5 and using information of the track id table and cache header associated with track 5, the FA determines that the prefetch indicator of track 5 is on, determines that the remaining prefetched data portions value (e.g., 3) of track 5 is no longer greater than the value of track ahead (e.g., 3), and instructs the DA to prefetch a second chunk of 6 tracks as indicated by 254. It should also be noted that as the FA examines the prefetch indicators for tracks 3-5 and determines that such prefetch indicators are on, the FA turns the prefetch indicators off or otherwise instructs the DA to perform this operation.

The element 256 shows an example representation of what may be stored in the cache slot header for track 5. The values of 256 may have been communicated to the DA by the FA at the first point in time as described above when retrieving the first prefetch chunk 252. At a later point in time in connection with the host read request for tracks 3, 4, and 5, the information stored in the cache slot header 256 may be used by the FA when processing track 5 in making a decision of whether to prefetch additional data for the sequential stream upon the occurrence of the READ HIT to prefetched track 5. Although not illustrated, the cache slot headers associated with each of tracks 3-8 may include the same sequential stream identifier, track ahead and number of tracks to prefetch as shown in 256. The position in sequential stream and remaining prefeched data portions identifier for each track is as indicated by the value pair in the track's corresponding entry of 262. In connection with the FA instructing the DA to prefetch tracks 9-14 as indicated by 254, the FA instructs the DA to store information from 256 in the cache slot headers for each prefetched track 9-14 including the following: SSID, track ahead, and number of tracks to prefetch. The FA also instructs the DA to set the prefetch indicators in the track id table for 9-14 to ON.

It should be noted that additional read hits to the data contained in cache slots 6, 7, and 8 may also trigger the FA to instruct the DA to prefetch tracks 9-14. In this case, the DA may perform processing to merge identical prefetch requests for tracks 9-14.

The foregoing illustrates how information stored in the cache slot header associated with a track may be used in determining whether to prefetch additional data upon the occurrence of a READ HIT to a prefetched data track.

As described herein with reference back to FIG. 5, the cache slot headers associated with tracks of a sequential stream may also include counter values for used 212 and missed 214 which will now be explained in more detail. As mentioned above, the values of 212 and 214 may be used in connection with assessing a measure of performance with respect to the prefetch processing for the associated sequential stream. The value of used 212 may represent a number of prefetched tracks which have been subsequently requested resulting in a READ HIT. The value of missed 214 may represent a number of misses resulting from various scenarios in which the prefetch processing for a sequential stream did not keep pace with the requests from the host.

It should be noted that described herein are examples of how values for used 212 and missed 214 may be determined. An embodiment may use other techniques in connection with determining a number of READ hits to prefetched tracks as represented by used 212 and in connection with determining a number of read misses to tracks in the sequential stream as represented by missed 214.

For a number of data tracks included in the sequential stream, the value of used 212 may be determined by examining the prefetch flags in the track id table for the data tracks and totaling the number of prefetched flags which are off with respect to prefetched tracks in a sequential stream. For a given sequential stream and considering a number of data tracks therein, a ratio may be determined with the numerator as the total number of prefetch flags determined as off, and a denominator as the total number of data tracks in the sequential stream which are considered. If the prefetch flag associated with a track is off, it is presumed that there was a READ HIT to the track and the prefetch flag was turned off by the FA in connection with processing the READ HIT as described herein.

In one embodiment, the value of used 212 associated with a track may be determined when performing a cut operation for cache management. In the cut operation in one embodiment, processing is performed by the FA to indicate for reuse selected cache slots containing data from the sequential stream. The expectation that a data track of a sequential stream will be reused or experience multiple hits, is low. Therefore, cut processing is a technique that may be used in an embodiment to limit the number of prefetched cache slots that remain in cache. In one embodiment as described, for example, in U.S. Pat. No. 6,807,619 and U.S. Pat. No. 7,143,393, a time stamp value may be associated with each cache slot. The time stamp may be updated at various times in connection with processing the data of the cache slot such as when there is a READ HIT, when initially storing data to the cache slot, to age a cache slot, and the like. In one embodiment, timestamp values may be used in connection with selecting a cache slot for use. A timestamp value of zero (0) may be used to indicate those cache slots which are first selected for reuse prior to other available cache slots having non-zero timestamps indicating an age associated with the cache slot. If there are no cache slots with a timestamp=0, a cache slot may be selected based on the age associated with a cache slot as indicated by the non-zero timestamp associated with those cache slots available for reuse. Special timestamp values may be used, alone or in combination with other values, to indicate whether a cache slot includes valid user data, invalid user data, is or is not available for reuse, and the like. For example, a cache slot containing write pending data to be destaged may include an indicator that the cache slot cannot be reused until the write pending data has been destaged from cache to the device. In other words, the write pending cache slot may include another indicator that the cache slot is not available for reuse. However, a cache slot containing valid user data, such as associated with the sequential data stream, may be a first candidate for reuse as indicated by a timestamp value of 0. Other embodiments may use other techniques so that, if a cache slot is needed in connection with subsequent processing, the cache slot containing sequential stream data having a timestamp=0 may be selected for reuse thereby evicting the sequential stream data contained therein from the cache. Such techniques of selectively assigning a timestamp value=0 to cache slots may be used in connection with cache management to limit a number of cache slots including data of the sequential stream.

For the sake of efficiency, processing associated with computing the updated values for the used counter 212 and performing a cut may be done in an embodiment at selected times. In one embodiment, a cut may be performed when certain criteria are met. The criteria may include the FA determining that there is a READ HIT to a prefetched data track and the criteria may include the following information from the cache slot header associated with the prefetched READ HIT data track: track ahead 208, position in sequential stream 204, and remaining prefetched data portions 206. More specifically, in one embodiment, a cut may be performed when the FA has determined that there is a READ HIT to a prefetched data track with its prefetched indicator ON, the "remaining prefetched data portions"<"track ahead", and the "position in sequential stream">X, wherein X represents a number of tracks of the sequential stream having cache slots that are not to be marked as candidates for reuse. When performing the cut and marking cache slots as candidates for immediate reuse (e.g., setting timestamps to 0) causing such cache slots to be reused prior to other cache slots with non-zero timestamps, the FA may gather information regarding the prefetch flags for the cache slots being marked with a timestamp=0 to determine which prefetched data tracks in the sequential stream have experienced a READ HIT. In one embodiment, use of a timestamp=0 may change the priority or order in which cache slots so marked are selected for reuse. Cache slots marked with timestamp=0 may be selected for reuse prior to other cache slots having different non-zero timestamp values.

As described above, when a cut may be performed and when the used counter (USED) may be computed in an embodiment may be represented as below. Note that values for "position in sequential stream 204", "remaining prefetched data portions 206", "track ahead 208", and prefetch indicator are associated with the cache slot including the data track of the READ HIT. The values of 204, 206 and 208 in one embodiment are included in the cache slot header associated with data track of the READ HIT:

```
IF (READ HIT to track) AND (prefetch indicator of track = ON) AND
   (remaining prefetched data portions < track ahead)
      THEN
      {
         set prefetch indicator of track=OFF;
         IF position in sequential stream > X THEN
         {
            Perform Cut and compute updated USED counter;
         }
         Perform processing to determine amount of data to prefetch, if any.
      }
```

As described herein, the cut processing may be performed based on the current sequential stream length (e.g., as indicated by the position in sequential stream). Cut processing may be performed when there is a READ HIT to a prefetched track and the existence of other conditions. In connection with cut processing, the used counter value may be updated for those cache slots which are being marked as candidate cache slots for reuse.

An example illustrating how a cut may be performed in an embodiment to mark cache slots for reuse and how to compute an updated number used 212 for a track will now be described.

Figure 7:
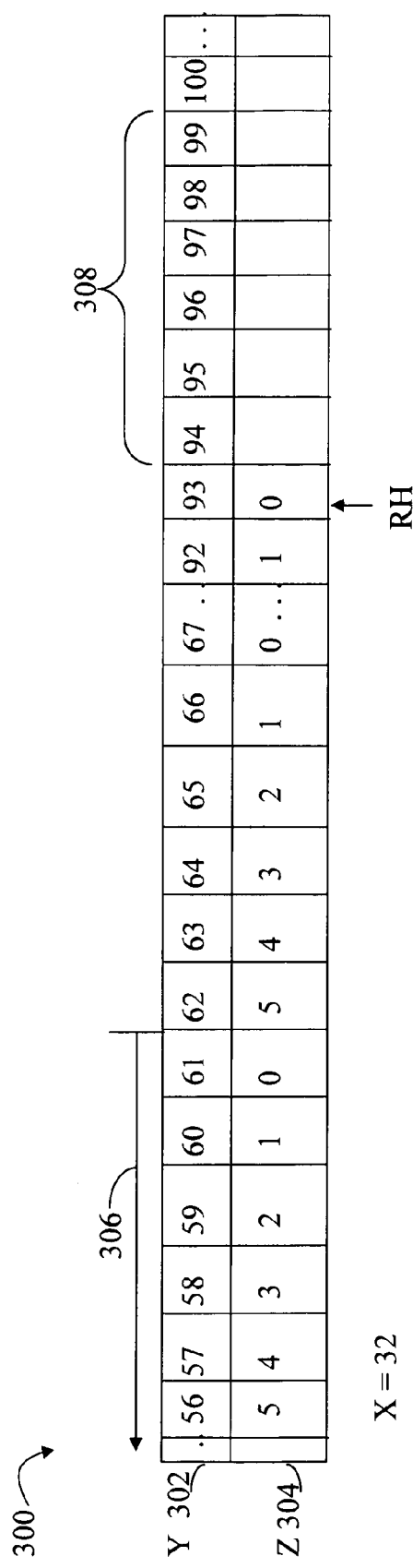

Referring to FIG. 7, shown is an example illustrating tracks of data associated with a sequential stream. The example 300 includes a row Y 302 indicating values for position in sequential stream 204 for successive tracks in the sequential stream. The row Z 304 indicates values for remaining prefetched data portions 206 for successive tracks in the sequential stream. It should be noted that in the example 300, a track of data in the stream is associated with an entry in both Y and Z forming a value pair as represented elsewhere herein by an entry in 262 of FIG. 6. For purposes of illustration in this example, it is assumed that data track Y has a corresponding position in sequential stream value, Y, as indicated by 302, and a corresponding remaining prefetched data portion value, Z, as indicated by an entry in 304. For example, data track 56 has a position in the sequential stream of 56 and a remaining prefetched data portions value of 5. Data tracks corresponding to Y values 56 through 93, inclusively, may be in cache when a READ HIT occurs to track 93. For all tracks, the value stored in the cache slot headers for track ahead=3 and tracks to prefetch=6. In this example, the number of tracks or amount of data of the sequential stream which remains in cache may be represented as X, which is selected as 32 for purposes of illustration. Cut processing is performed to mark selected cache slots for reuse.

In connection with track 93 a read operation is received and the FA performs processing and determines that the following evaluates to true:
(READ HIT to track) AND (prefetch indicator of track=ON) AND (remaining prefetched data portions (e.g., 0)<track ahead (e.g., 3)

The FA does not modify the timestamps associated with cache slots for the immediately preceding X or 32 tracks measured from the last prefetched track of the prefetch "chunk" including the track experiencing the READ HIT (e.g. "chunk" refers to the number of tracks prefetched with a single prefetch request such as in accordance with a selected value for "number of tracks to prefetch" 210. The foregoing last prefetched track of the prefetch "chunk" may be determined by examining values of Z beginning with the current track experiencing the READ HIT and subsequent tracks and proceeding to look for the first track having a value of Z=0). If the stream does not have a current length greater than X, then cut processing is not performed. In this example, the current length of the stream is represented by Y 302, position in sequential stream, which is 93. Since the "position in sequential stream" (e.g., 93) is greater than X (e.g., 32), cut processing is performed. Cut processing may be performed by determining an ending cut position. If Z=0 for the track experiencing the READ HIT (the remaining prefetch data portions for a prefetched "chunk"=0), then the ending cut position may be determined as Y-X (e.g., 93–32) which is 61 for track 93, using the Y value for the track experiencing the READ HIT. Beginning with the track at position Y=61, the timestamp of the cache slot associated with the track is examined to determine if the timestamp is already 0. If so, cut processing stops since a timestamp value of 0 indicates that this cache slot was already marked in connection with a previous iteration of cut processing. If the timestamp of track 61 is not already 0, the cache slot's timestamp is set to 0 and processing continues with the next previous track, track 60. Cut processing continues by iteratively looking back one track at a time until either the beginning of the sequence is reached (e.g., as indicated by the position in sequential stream for the track), or until it is determined that a cache slot associated with an examined track already has a timestamp value of 0. This process of looking back and marking cache slot timestamps=0 beginning with the ending cut position of 61 is illustrated by the arrow 306. In the case where Z≠0 for the track experiencing the READ HIT (e.g., as may be the case where there is a READ HIT to track 91 or 92), the FA performs processing to determine the value of Y associated with the last track in the same prefetched "chunk". In other words, the FA determines the value of Y associated with that track in the same prefetched "chunk" having a corresponding Z=0. For a READ HIT to a track having a value Z≠0, the FA may determine an ending cut position represented as follows. The Y and Z values in the representation below refer to Y and Z values of the track experiencing the READ HIT:

$$\text{ending cut position} = (Y+Z)-X$$

so that the ending cut position may always be determined with respect to the last track of the prefetched "chunk" including the track experiencing the READ HIT. To further illustrate, consider the case where the READ HIT occurred to track 92. In this case, the values of Z and Y are, respectively, 1 and 92 so the ending cut position may be determined as (Y+Z)-X (e.g., (92+1)-32=93-32=61. It should be noted that the foregoing calculation of (Y+Z)-X may also be used to represent the ending cut position when Z=0. Other embodiments may select the ending cut position differently than as described herein. For example, the amount remaining in cache, X, may be determined from the beginning of the "chunk" so that the ending cut position may be represented as:

$$\text{ending cut position} = (Y+Z)-X-\text{value of 210}.$$

An updated used value may be computed as follows. For each cache slot whose timestamp is set to 0 in connection with cut processing as described above, the prefetch flag in the track id table is examined. A total is determined representing the number of cache slots which have had their timestamp set to 0 and which also have the prefetch flag off or false (e.g., indicating that there was a READ HIT to the track associated with the cache slot). In connection with prefetching any more data, such as prefetching tracks 94-100, a used value for these prefetched tracks 94-100 may be determined by the FA adding the used value 212 associated with track 93 (e.g., experiencing the READ HIT) and the total (e.g., representing the number of cache slots in this iteration of cut processing which have had their timestamp set to 0 and which also have the prefetch flag off or false).

For purposes of illustration in connection with the example 300 of FIG. 7, let the current number used=50 as included in the cache slot header associated with track 93 and that tracks 56 through 61, inclusively, are in cache and do not have their associated cache slot time stamps=0 when the READ HIT to track 93 occurs. In connection with cut processing performed when there is a READ HIT to track 93, the FA may perform processing as described above to compute an updated used value 212 which the FA instructs the DA to include as the used value 212 in the cache slot header of each prefetched data track. If all 6 tracks examined (e.g., tracks 56-61) each have an associated prefetch indicator=off or false, then the updated used value is 50+6=56. If the FA requests that the DA prefetch data tracks 94-100, the FA performs processing as described herein including instructing the DA regarding what information to place in the cache slot headers for these prefetched track 94-100. The information includes storing a used value of 56 into the cache slot header of each prefetched track.

Besides the foregoing first cut technique used to perform a cut, an embodiment may also use a different technique. In connection with a second different cut technique that may be used in an embodiment, the FA sends the DA a message to prefetch data. The FA may make a determination to prefetch additional data as described above when there is a READ HIT to a prefetched track. After the DA retrieves the prefetched data from the disk, the DA sends a completion message to the FA indicating that the DA has completed prefetching the additional or next prefetch chunk of data. The completion message from the DA indicates the tracks which the DA has just prefetched. In response to the completion message, the FA may then perform processing to determine if cut processing is necessary as described above. If so, the FA may perform cut processing as described above in the first technique determining an ending cut position with respect to the last track in the previously prefetched chunk. To further illustrate, reference is made the example above when there is a READ HIT to track 93 and the FA requests that the DA prefetch additional data by prefetching tracks 94-99, inclusively. As described elsewhere herein in following paragraphs, the DA may perform merge processing to merge any prefetch requests for the same data (e.g., if there are other pending prefetch requests for any of the same tracks as may be the case if there was a READ HIT to track 91 or 92). Once the DA has processed the prefetch request and the prefetched data has been retrieved from disk by the DA, the DA sends a completion message to the FA indicating that tracks 94-99 have been prefetched. In response, the FA may determine that cut processing is necessary and then perform cut processing as described above in the first technique. The FA may make a determination whether to perform cut processing by examining the position in the sequential stream (POS) of the track experiencing the READ HIT or the POS of the track immediately preceding the first track of the prefetched chunk, and comparing one of the foregoing to X. For this example after tracks 94-99 have been prefetched, the FA may determine to perform cut processing if the POS of track experiencing the READ HIT or POS of track immediately preceding the prefetched chunk>X (e.g., 93>32 in this case). Cut processing may be performed in accordance with the first technique as described above by the FA using an end cut position of 61 based on track 93, the track immediately preceding the first track of the prefetched chunk 94-99. The FA may then determine the used count value and accordingly update any cache slot headers (e.g., may update time stamps of cut cache slots to 0, and accordingly update any used count values of cache slots containing tracks 94-99). The second cut technique may be performed for regular and/or non-regular devices. In the second cut technique, the trigger event which causes the cut processing and updating of any used values performed by the FA is receipt of the completion message from the DA indicating that the DA has completed prefetching data associated with a previously issued prefetch request from the FA.

A third cut technique may also be used in an embodiment for regular devices. In connection with the third cut technique that may be used in an embodiment with regular devices, the DA may perform cut processing as described in the first cut technique and then accordingly update any time stamps or used count values of prefetched data. The cut processing may be performed by the DA as part of processing a request from the FA to prefetch data when the FA has detected a READ HIT to a prefetched track of data. Using information communicated from the FA in the prefetch request (e.g., the FA instructs the DA to set prefetch indicators for any prefetched tracks), the DA determines that the FA is requesting the DA to prefetch data. In response, the DA may make a determination as to whether to perform cut processing based on the POS values as described above (e.g., to determine if position in sequential stream (POS)>X). If the DA determines to perform cut processing, the DA may perform cut processing as described using the first technique. To further illustrate, consider the FA issuing a request to the DA to prefetch tracks 94-99, inclusively, as described above with reference to FIG. 7. As described elsewhere herein, the DA may perform merge processing to merge any prefetch requests for the same data tracks. After the DA has prefetched the data, the DA may perform cut processing using the first technique as described above using an ending cut position of 61 based on track 93, the track immediately preceding the first track of the prefetched chunk 94-99. The DA may then determine the used count value and accordingly update any cache slot headers (e.g., may update time stamps of cut cache slots to 0, and accordingly update any used count values of cache slots containing tracks 94-99). In an embodiment using the third technique for regular devices, the embodiment may have the FA perform processing using the first cut technique or the second technique described above for non-regular devices.

With reference back to FIG. 7 in an embodiment performing the first cut technique in connection with determining a ratio with the used value, the FA may compute a ratio having a numerator of the updated used value (e.g., 56) as described above, and a denominator which is the position in the sequential stream of the ending cut position (e.g., 61). The foregoing ratio may be referred to as a success ratio indicating a percentage of how much of the prefetched data was subsequently requested by the host (e.g., subject to a READ HIT). As described in more detail elsewhere herein, the success ratio may be used in determining how much additional data to prefetch upon the occurrence of a READ HIT to a prefetched data track. The success ratio may also be used to determine when to terminate a sequential stream and not prefetch any more data in connection with the stream. A success threshold may be specified in an embodiment. If the FA performs cut processing and computes an updated used value in connection with a READ HIT to a prefetched cache slot, the FA may utilize the computed success ratio in connection with determining whether to prefetch any more data or how much data to prefetch. The FA may determine not to prefetch any more data for the sequential stream if the success ratio<success threshold. Also, if the success ratio is greater than the success threshold, the FA may use the success ratio in determining how much data to prefetch this time. The use of the success ratio is connection with prefetching is described in more detail in following paragraphs.

In connection with counting a number of misses as represented by counter values for missed 214 associated with a sequential stream, different types of READ MISSes may occur. A first type is a short miss. The FA may send a message to the DA to prefetch data but the prefetched data request may not yet be completed by the DA (e.g., prefetched data not yet in cache) when a host request is received resulting in the READ MISS which is also a short miss. In other words, with a short miss, the host requested data is not in cache although it has been requested by the FA in connection with a prefetch request sent from the FA to the DA. A second type is a long miss. The host request for data may be received and processed by the DA prior to the prefetch request being issued from the FA to the DA. In other words, with a long miss, the host requested data has not yet been requested by a prefetch request from the FA to the DA. Such prefetch request is sent by the FA after the host I/O operation is received. All other READ MISSes may be referred to as a regular or random read miss as detected by the FA, for example, at the start of a new sequential stream. Short and long misses may occur if data prefetching processing does not keep pace with host I/O requests. The occurrence of short and/or long misses may result in gaps in the sequential stream where the gap is a READ MISS rather than a READ HIT because the data is not in cache for use when requested by the host.

In one embodiment, the DA may perform processing to identify long misses and short misses and update the missed counter values as will be described. The FA may perform processing to identify a regular or random miss. In connection with the regular or random miss in an embodiment starting values for the position in sequential stream with the first prefetched track as illustrated in FIG. 6, the missed counter associated with a sequential stream does not count the tracks associated with the regular or random miss that may occur at the start of the sequential stream. In other words, the missed counter value may take into account those misses which have occurred since prefetching for a sequential stream has commenced which includes short and long misses but not the regular or random miss(es) as may occur at the start of a sequence.

A short read miss or short miss may be identified as follows by the DA. When the DA has retrieved requested prefetched data and the DA is storing information in a cache slot, the DA may also check to see if there are any outstanding host I/O requests for the data the DA has just retrieved in accordance with a prefetch request. If so, then such prefetched data which has been retrieved by the DA and which has also been requested by the host is the subject of a short miss. In one embodiment, a timestamp may be stored with each host request and each prefetch request. When the DA has completed servicing the prefetch request, the DA may examine the list of host requests to determine if there is a timestamp of a host request for the data indicating that the host had requested the same data after the prefetch request for the data was issued to the DA. If the DA determines that a short miss has occurred, the DA updates the missed counter value for each prefetched data track by the number of tracks of the host request causing the READ MISS which are also in the prefetched data chunk. For example, the host may request tracks 1-4 and tracks 1 and 2 are in cache but 3 and 4 are not, thus causing the READ MISS. The DA may be in the process of completing a prefetch request to prefetch tracks 3, 4, 5, and 6 and detects the host request. The DA updates the missed counter in the cache slot headers of all prefetched data tracks 3-6 by adding 2 to the missed counter value as may be communicated from the FA in connection with the prefetch request.

A long read miss or long miss may be identified as follows by the DA when servicing a host request. Once the host requested data has been retrieved from disk by the DA, the DA may examine outstanding prefetch requests issued to the DA by the FA. If the host requested data is also the subject of a pending prefetch request, there has been a long miss. When the DA has completed servicing the host I/O request, the DA may examine the list of pending prefetch requests. A long miss is detected if there is a pending prefetch request for the same data as requested by the host and if such prefetch request was issued after the host request. The determination as to whether the prefetch request was issued after the host request may be determined by examining timestamp values associated with each indicating when received by the DA. In connection with a long miss, the DA may update the outstanding prefetch request to accordingly increment the missed counter values as communicated from the FA for the prefetch request by an amount in accordance with the long miss. For example, the host requests tracks 2 and 3 and there is prefetch request received after the host request to prefetch tracks 1-4. The DA determines that there is the foregoing prefetch request pending after the DA retrieves tracks 2 and 3 for the host. The DA then updates the cache slot headers for tracks 2 and 3 to include information as communicated from the FA in the prefetch request and also updates the missed counters for tracks 2 and 3 by 2. Additionally, the DA updates the prefetch request to have the missed counter values for tracks 1 and 4 also incremented by 2. The DA removes from the pending prefetch request the request to retrieve tracks 2 and 3 but leaves pending a prefetch request for tracks 1 and 4 since prefetch requests may be serviced at a lower background priority than host requests. As described, the DA performs processing to merge host requests and prefetch requests for the same data. As part of this merging, the DA may merge information from the two requests and update appropriate missed counters as described.

The DA may also merge two or more pending prefetch requests for the same data tracks. In such cases, the used counter values and other information communicated by the FA for each request should be merged and included in a single prefetch request. There may be two pending prefetch requests for the same data, for example, when the FA has two READ HITS for two consecutive tracks in a sequential stream. For each of the two READ HITS, the FA may issue a prefetch request for the DA to prefetch the same next set of tracks.

It should be noted that the foregoing is only one way in which miss counts may be determined and information communicated between the FA and DA. The FA may communicate to the DA that the DA may need to update a missed count depending on whether there is a short miss and/or long miss detected by the DA. An embodiment may have the DA make appropriate updates to the miss count depending on the information communicated by the FA. An embodiment may also track the different types of misses (e.g. short miss and long miss) as separate counter values.

The missed counter value included in a cache slot header of a data track may be used in determining a missed ratio with the missed counter value 214 as a numerator and the position in sequential stream 204 as the denominator. As described elsewhere herein, the missed ratio may be used by the FA in connection with updating or tuning the track ahead 208 and/or number of tracks to prefetch 210 for a stream. The missed ratio may also be used to determine whether to stop prefetching additional data and terminate a sequential stream. For example, a missed ratio threshold may be defined. If the missed ratio is above the missed ratio threshold, the FA may increase the value of 208 and/or 210 for a stream. A high missed ratio may indicate a need to be more aggressive in connection with prefetching to keep up with the host requests. If the missed ratio, however, is above a maximum value, and the current values of 208 and/or 210 are also above specified limit(s), a decision may be made by the FA to terminate the sequential stream.

In connection with processing a READ MISS by the FA when a sequential stream is recognized, the FA determines whether the READ MISS is part of an existing sequential stream or otherwise indicates a start of a new stream. As described elsewhere herein, this determination may be made by examining information associated with the READ MISS operation and information included in the cache slot header associated with the previous data track (e.g., prior to the starting track of the READ MISS). If the READ MISS is part of an existing stream, the FA instructs the DA to store information in the cache slot headers for the READ MISS data and the prefetched data based on information from the cache slot header of the previous data track. Specifically, the FA may instruct the DA to include the following information from the previous track's cache slot header in the cache slot headers for the READ MISS data and prefetched data:

copy SSID, track ahead, number of tracks to prefetch, and used counter, updated position in sequential stream relative to previous track, update missed counter by number of tracks for READ MISS that are not in cache For the READ MISS data, the value for the remaining prefetched data portions 206 may indicate that the associated track is not part of a prefetch (e.g., may include a default value such as −1).

In connection with processing a READ HIT and prefetching additional data when there is a READ HIT to a previously prefetched track, the FA instructs the DA to use values from the current READ HIT data track in cache slot headers for the prefetched data. Specifically, the FA may instruct the DA to include the following information from the cache slot header of the READ HIT data in the cache slot headers of any prefetched data:

copy SSID, track ahead, number of tracks to prefetch, and missed counter updated position in sequential stream relative to READ HIT data track, if cut processing is performed, update used counter by number of tracks having prefetch indicators examined which are off. (e.g., the number of tracks having prefetch indicators which are examined are those having cache slots with timestamps set to 0 during cut processing). The "used" value associated with each prefetched track="used" of READ HIT data track cache slot header+number of cache slots examined during cut processing whose timestamps are set to 0 having a prefetch indicator off.

values for remaining prefetched data portions identifier 206 are determined based on amount prefetched and distance of each from the end of prefetch chunk.

It should be noted that in an embodiment, the value for track ahead 208 may be greater than the amount of data or number of tracks to prefetch 210. In such an embodiment when processing a READ HIT, values for used 212 and missed 214 utilized when making a determination as to how much data to prefetch, whether to continue prefetching for the sequential stream, and the like, may be obtained from the cache slot header associated with the last prefetched data track rather than those associated with the track experiencing the READ HIT. The values for used 212 and missed 214 associated with the last prefetched track may be used in determining updated values for used 212 and missed 214 of the additional prefetched data when there is a READ HIT to a previously prefetched track as described above. Furthermore, it should be noted that an embodiment may use other techniques, alone or in connection with those described herein, to communicate values used in connection with prefetching data such as may be communicated between the FA and the DA. For example, an embodiment may communicate information regarding a current value or total for the used count, missed count and the like, using global memory.

Processing may be performed in connection with clearing information used with the techniques herein from cache slot headers. In one embodiment, the DA may clear a cache slot header when the DA obtains a cache slot for use in storing data retrieved for a READ MISS. The DA may clear the cache slot header prior to use in connection with data for the READ MISS. When performing a write operation, the FA may obtain the cache slot used to store data of the write operation. At some later point, the DA destages the data from the cache to disk. After the DA destages the data, the DA may perform processing to clear or initialize the cache slot header locations including information used in connection with the techniques herein.

An embodiment may use information contained in the cache slots to determine a rate at which the host is sending I/O operations. In one embodiment, a timestamp value may be associated with when an I/O operation is received by the data storage system. The FA may perform processing by examining timestamp values associated with different tracks in the sequential stream. Using such time information, the FA may determine how many I/O requests and/or an amount of data associated therewith are received in time period to determine a host I/O processing rate (e.g., number of tracks requested in a time interval). This calculation may be done at selected times by the FA for example, under the same conditions or criteria in which cut processing is performed. The host I/O processing rate may be used in tuning or adjusting (upward or downward) the track ahead 208 and/or number of tracks to prefetch 210 for a sequential stream.

What will now be described in more detail is how an embodiment may determine values for the track ahead 208 and/or number of tracks to prefetch 210 for a sequential stream. Such processing may be performed by the FA when there is a READ HIT to a prefetched track. In an embodiment, the FA may determine when the values for 208 and/or 210 are to be updated. The DA may be instructed by the FA to update values for these parameters or other information for cache slot headers. Alternatively, an embodiment may have the FA perform any such updates. It should be noted that although what is described herein may be characterized as FA-driven in that the FA decides when the values for 208 and/or 210 are to be updated, an embodiment which has a DA or other component perform prefetching may also utilize the techniques herein for selection and/or adjustment of values for 208 and/or 210. As described herein, the track ahead 208 is used in determining when to prefetch additional data upon the occurrence of a READ HIT to a prefetched data track. As also described herein, the number of tracks to prefetch 210 indicates an amount of data which is retrieved for each prefetch request issued from the FA to the DA. In following paragraphs, different criteria are described that may be used in connection with selecting initial values for, or subsequently adjust values for, track ahead 208 and/or number of tracks to prefetch 210 for a sequential stream. In other words, one or more of the criteria described herein may be used by the FA to select or adjust the track ahead 208 and/or number of tracks to prefetch 210 for a sequential stream. It should also be noted that values for track ahead 208 and/or number of tracks to prefetch 210 for a sequential stream may be each be adjusted subject to an upper limit and/or lower limit. The upper and lower limits may be fixed or predetermined as well as configurable. In other words, each of the criteria that may be used, alone or in combination with other criteria, may be used to adjust 208 and/or 210 subject to an upper and/or lower limit for each value.

The current size or length of the sequential stream may be included in the criteria for selecting values for 208 and/or 210. The current length of the sequential stream may be indicated by the position in the sequential stream 204 included in a cache slot header for a data track. The current length of the stream may be used in increasing or decreasing values for 208 and/or 210 associated with the stream. As an example, an embodiment may define one or more ranges of sequential stream lengths and select a value for 208 and/or 210 based on the current stream length using the ranges. For example, the following ranges for stream length may be defined:

if current length<SIZE1, then track ahead=VALUE1, number of tracks to prefetch=VALUE2 if current length>=SIZE1 AND current length<SIZE 2, then track ahead=VALUE3, number of tracks to prefetch=VALUE4 if current length>=SIZE 2, then track ahead=VALUE5, number of tracks to prefetch=VALUE6.

The longer the sequential stream, the better the chance the stream will continue. As such, as the length of the stream increases, an embodiment may increase values for 208 and/or 210.

The size of the current I/O request (e.g., how much data the host has requested for a READ operation) may be included in the criteria for selecting values for 208 and/or 210. In one embodiment, values for 208 and/or 210 may be at least the size of the current host I/O request, a multiple of the size of the current host I/O request (e.g. twice the size of the I/O request), and the like. Values for 208 and/or 210 may be adjusted (e.g., upward or downward) for a sequential stream as the size of the I/O accordingly varies. If the host request more data with each I/O request, the amount of data prefetched may need to also increase in order for prefetch processing to maintain a processing rate in accordance with that of the host. In an embodiment, the size of the I/O request may not affect the amount of data prefetched for short sequences (e.g., sequential streams less than a particular size). For such short sequences, the amount of data prefetched may be a fixed size which does not vary with the size of the I/O. For a long sequence (e.g., sequential streams larger than a specified size), values for 208 and/or 210 may vary with the size of the I/O operation. It should be noted that an embodiment may continue to increase the values for 208 and/or 210 up to an upper bound or limit associated with each as described above. It should be noted that if the size of the I/O request is larger than a specified upper limit or size, an embodiment may terminate prefetching for a sequential stream.

In one embodiment, the sizes selected for 208 and 210 may be dependent on one another. For example, an embodiment may select a value for 208 which is some multiple or factor of 210 (e.g., 208 may be 0.5 times the size of 210), or vice versa (e.g., 210 may be 0.5 times the size of 208).

The missed ratio may be included in the criteria for selecting values for 208 and/or 210. As described elsewhere herein, the missed ratio may be used as indicator to determine when more aggressive prefetching is needed (e.g., increasing values for 208 and/or 210). If the missed ratio is more than some threshold, values for 208 and/or 210 for a stream may be increased. Also, if the missed ratio is less than some threshold value, an embodiment may also accordingly decrease 208 and/or 210.

The success ratio may be included in the criteria for selecting values for 208 and/or 210. As described herein, the success ratio may be characterized as an indicator regarding how much data that was prefetched resulted in a subsequent READ HIT. In one embodiment, if the success ratio is less than some threshold, the FA may stop the prefetching for the sequential stream so that no additional data is prefetched. If the success ratio is more than some threshold, the FA may change values for 208 and/or 210 in accordance with the current success ratio. In other words, the current value of the success ratio determines an amount by which 208 and/or 210 may be increased/decreased accordingly. As an example, an embodiment may define one or more success values ranges such as:

if success ratio>threshold 1 then increase/decrease track ahead and/or number of tracks to prefetch by amount1 if success ratio is between threshold 1 and threshold 2, then increase/decrease track ahead and/or number of tracks to prefetch by amount2

Values for 208 and/or 210 may also be determined in accordance with data storage and/or host configuration such as, for example, device characteristics (e.g., speed, size, etc.) and number of devices, number of hosts, RAID group size, rate of incoming I/Os, and the like.

If one or more metrics, such as the success ratio and/or missed ratio, used in an embodiment in measuring the performance of the prefetching techniques for a sequential stream do not indicate sufficient performance levels, then an embodiment may terminate additional prefetching for the sequence. For example, if the success ratio is not at least some minimum success value and the missed ratio is not less than some missed value, an embodiment may decide not to prefetch any more data for the associated sequential stream. An embodiment may also increase values of 208 and/or 210 up to an upper limit or maximum and may then decide not to prefetch any more data for an associated sequential stream if the upper limits for 208 and/or 210 are reached, the success ratio is not at least some minimum success value, and the missed ratio is not less than some missed value. It should be noted that an embodiment may terminate additional prefetching for the sequential stream based on one or more of: whether the success ratio is smaller than some minimum value, whether the missed ratio is larger than a specified value, and whether the size of the I/O request is larger than some upper limit or value.

An embodiment may also use a QOS (quality of service) level or priority in connection with selecting values for 208 and/or 210. In the data storage system, I/O requests may originate from different applications executing on one or more different hosts. A host, or particular application executing thereon, may request I/Os from a particular storage system, device(s), and the like. The data storage system may store the data from multiple applications executing on multiple hosts. The data storage system may service requests in accordance with an appropriate priority level or quality of service (QOS) selected for each of the different requesters (e.g., application, host, and the like) by associating a QOS level with a data storage device used by a particular requester. For example, the data storage system may service I/O requests from the different applications using different QOS levels. A QOS level may be associated with servicing an application's I/O requests in accordance with the particular priority objectives of the application. The data storage system may be configured to service I/O requests from the different applications in accordance with defined QOS levels or priorities. Each QOS level may affect the amount of data storage system resources allocated for servicing a request, such as the I/O request. When servicing I/O requests from the different applications, the QOS level associated with each application may be used in connection with determining whether to allocate additional data storage system resources for use for a particular sequential stream affecting the rate at which I/O requests are processed for the different applications.

In connection with the techniques herein, a QOS level may be associated with each device and thus, with the sequential stream for that device (e.g., device as may be indicated in the sequential stream identifier 202 of FIG. 5). It should be noted that in following paragraphs regarding, reference is made to using different factors or criteria in connection with updating and selecting a value for 210. However, it should be noted that an embodiment may also use the factors and criteria in connection with updating or selecting a value for 208, alone or in combination with, a value for 210. An embodiment may select or update a value for the number of tracks to prefetch 210 for a sequential stream in accordance with the missed ratio for the sequential stream, a measure of utilization or current load of one or more data storage system resources, and missed ratio of current sequential stream at associated QOS level in comparison to one or more other missed ratios associated with other sequential streams having a higher associated QOS level than the current sequential stream. An embodiment may examine the foregoing factors in combination to determine a value for 210. As described above, if the missed ratio associated with a sequential stream increases, this may be an indication that the number of tracks to prefetch 210 should be increased. Data regarding utilization or current load of one or more resources may be collected. Resources of the data storage system that may be considered include each DA, FA, disk drive, data storage system processor, and the like, used in connection with a sequential stream. Utilization may be measured as appropriate for the particular resource and may include I/O operations or requests processed, an amount of data processed in a particular time period, an amount of time or percentage of time that a resource is idle vs. in use, and the like. Threshold utilization or load values may be specified to determine a utilization condition and whether additional resource have available capacity or bandwidth for further allocation. If one or more resources associated with servicing a sequential stream is indicated as having a state of overutilization (e.g., is at or beyond a maximum utilization level), then an embodiment may decrease the number indicated by 210. On the other hand, if one or more of the foregoing resources is indicated as having a state of underutilization (e.g., at or below a minimum utilization level), then an embodiment may increase the number indicated by 210. The missed ratio of current sequential stream at an associated QOS level may be compared to one or more other missed ratios associated with other sequential streams having a higher associated QOS level than the current sequential stream. If another sequential stream has a higher associated QOS level with a missed ratio above a certain level (e.g., at or larger than the missed ratio of the current stream), an embodiment may not increase or may decrease the number of tracks to prefetch 210 for the current stream so as not to further allocate resources to the current stream having a lower QOS level or priority than other I/O streams having a higher QOS level or priority.

As another variation, an embodiment may consider the missed ratio of sequential streams sharing the same one or more resources, such as a same device, when making a determination as to whether to update, such as increase, the amount of data to prefetch 210 for a sequential stream. The missed ratio of the sequential streams sharing the same device or other resources may be considered alone, or in combination with, other criteria described herein. For example, for one or more sequential streams from a same device, when selecting or updating a value for 210 for one of the sequential streams, an embodiment may consider a measure of utilization or current load of the device in combination with the missed ratio and QOS level for each such sequential stream for the same device. In connection with this variation, an embodiment may also consider streams for the same device for a selected one or more QOS levels, such as streams at a same or higher priority QOS level than a QOS level of a stream whose amount of data to prefetch 210 is being evaluated for possible updating.

In the foregoing, it should be noted that although reference is made to examining the QOS level of another sequential stream having a higher associated QOS level, an embodiment may also examine QOS levels associated with other activities or consumers of resources besides another sequential stream.

In connection with selecting a value for the amount of data to prefetch, an embodiment may consider the foregoing, alone or in combination with other criteria, to perform a general cost-benefit evaluation by code which may be executed to select a value for 210. The QOS level and missed ratio associated with each sequential stream may be used in combination with current resource utilization or load to prioritize resource allocation among one or more sequential I/O streams.

As described above, the values for track ahead 208 and/or number of tracks to prefetch 210 may be increased or decreased in accordance with upper and/or lower limits. Such limits may be fixed. For example, an embodiment may have an upper limit for the number of tracks to prefetch of a cylinder of data. An embodiment may use a default value for a limit and may reconfigure the limit based on a user configuration setting, as well as one or more of the foregoing criteria (e.g., size of the I/O, current length of the sequential stream, success ratio, missed ratio, and/or system configuration (e.g., of the data storage system and resources, host(s) being serviced, rate of incoming I/Os, and the like)). In other words, the criteria described herein may be used in selecting values for 208 and/or 210 as well as also selecting limits associated for each of 208 and/or 210.

As described above, the foregoing criteria may be used in determining values for 208, 210, limits, thresholds, and/or default values. The criteria may be characterized as dependent variables or inputs used in determining one or more outputs including values for 208, 210, limits, thresholds, and/or default values. More specifically, the foregoing may be expressed as a function with one or more inputs (e.g., the foregoing criteria) used to determine one or more outputs (e.g., one or more of a limit, default value, threshold, number of tracks to prefetch, track ahead).

Figure 8:
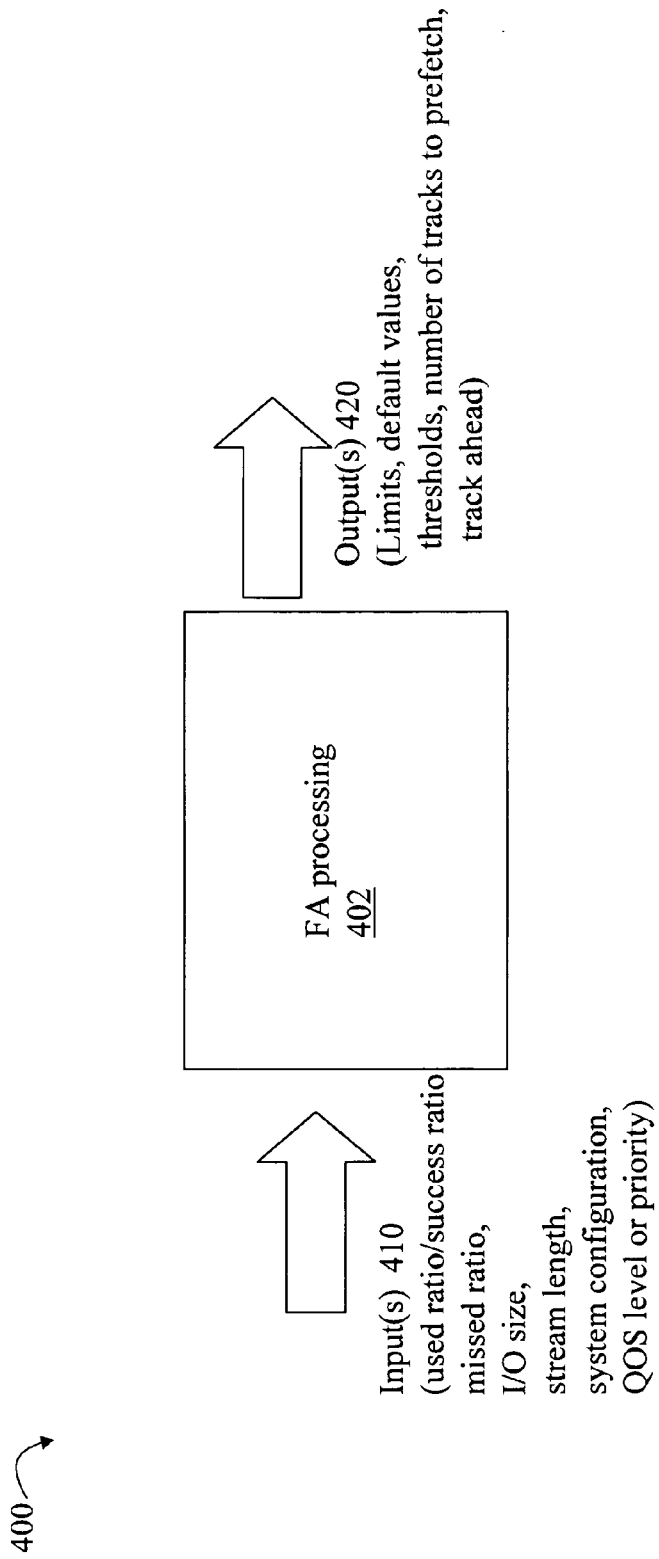
FIG. 8 is an example representation of how the techniques herein may be used to determine one or more values affecting prefetch processing for a sequential stream.

Referring to FIG. 8, shown is an example 400 illustrating how one or more inputs 410 may be used to determine one or more outputs affecting prefetch processing using the techniques herein. The example 400 illustrates that as described above in which the one or more inputs 410 may include one or more criteria. The criteria may include the success ratio (also referred to as used ratio), missed ratio (e.g., of the current stream and/or other streams) I/O size, stream length, QOS level or priority (e.g., of the current stream and/or other streams), and/or system configuration. Limits or thresholds associated with the missed ratio, success ratio, amount of data or number of tracks to prefetch, and track ahead parameter may be determined in accordance with the system configuration (e.g., of the data storage system and resources, host(s) being serviced, rate of incoming I/Os, and the like). It should also be noted that default values for the amount of data or number of tracks to prefetch, and track ahead parameter may be determined in accordance with the system configuration (e.g., of the data storage system and resources, host(s) being serviced, rate of incoming I/Os, and the like). The FA may use one or more of such inputs associated with a sequential stream to determine one or more outputs 420. The outputs 420 may include limits, default values and thresholds associated with the number of tracks to prefetch 210 and/or track ahead 208 for a sequential stream. The outputs may also include values for 208 and/or 210 for the sequential stream. An embodiment may implement the foregoing illustrated in FIG. 8 as a function having one or more inputs 410 as input parameter values and one or more outputs 420 as the output parameter values. The FA may select, modify or otherwise update the output values 420 at various times during the life of a same sequential stream. The FA, as well as another component, may use one or more of the inputs 410 to select default values used for a sequential stream or all sequential streams.

To further illustrate processing as may be performed in connection with the techniques herein, a detailed example will be described. The following example utilizes the first cut technique described herein.

Referring to FIG. 9, shown is a table of information associated with tracks of data in a recognized sequential stream as may be used in an embodiment in connection with the techniques herein. The table 1000 includes a first row indicating a track number associated with a track of data. For each track of data, a column of 8 items or entries is included in the table in which the first 7 entries illustrate information included in the cache slot header for the track of data and the $8^{th}$ entry (PF flag) indicates the prefetch flag value for the track of data. The table 1000 represents a snapshot of information at a first point in time in an example in which the FA has recognized a sequential stream and issued a first prefetch request (PF REQ 1) to the DA. Prior to this first point in time, the FA has received a first READ MISS (RM) to track 1 and requested the DA to retrieve track 1. A second READ MISS has occurred and the FA recognizes the beginning of a new sequential stream and has instructed the DA to prefetch a first chunk of tracks 3-8. Table 1000 indicates the values stored in the cache slot headers and prefetched flags for the tracks 1-9 after the DA has completed servicing the first request for READ MISS track 1, and a second request to obtain track 2 and prefetch tracks 3-8. In this example, the FA "looks back" one track (e.g., to track 1) in connection with performing recognition processing upon occurrence of the READ MISS for track 2. Also, in this example, the position in sequential stream values (POS) 204 start with track 1 (e.g., the track prior to the READ MISS causing the first or initial sequential stream prefetch). ID1 may represent the SSID 202 including the device and time information associated with the READ MISS to track 1 or may represent the SSID associated with track 2 depending on the SSID associated with the new stream in an embodiment. In connection with the request to obtain data for the READ MISS to track 2 and prefetch tracks 3-8, the FA instructs the DA to store the values as indicated in the table 1000. For purposes of illustration, default values as indicated in 1002 are used in which the number of tracks to prefetch (Amt to PF) 210=6, track ahead (AHEAD) 208=3, and X (number of tracks which remain in cache in connection with cut processing)=4 for this stream.

Table 1000 of FIG. 9 illustrates information stored in cache slot headers and prefetch flag values after the DA has completed retrieving the data for the second request including the READ MISS track 2 and prefetched tracks 3-8 and storing values as instructed by the FA.

Referring to FIG. 10, shown is a table 1100 of information associated with the tracks of data in a recognized sequential stream as may be used in an embodiment in connection with the techniques herein. The table 1100 includes an additional row of information, TS, indicating the timestamp (TS) value associated with the cache slot containing the indicated track of data for the column. The table 1100 illustrates the values from table 1000 after the FA receives a read operation for tracks 3-6 resulting in a READ HIT (RH). Note that when performing READ HIT processing for tracks 3, 4, and 5, the FA sets each track's PF flag=off and no additional data is prefetched since the number of remaining prefetched data portions (REM PF) 206 is not less than AHEAD 208. When processing track 6, READ HIT processing by the FA does the following:

- sets PF flag for track 6 off (e.g., =0)
- performs cut processing and computes an updated used counter value since this is a READ HIT to a track with the prefetch indicator=ON, the number of remaining prefetched data portions (REM PF 206) is less than track ahead (AHEAD 208) (e.g., 2<3), and the current position in sequential stream (POS 204) is greater than X.

In connection with FIG. 10, it should be noted that those cache slots having timestamps (TS values)=0 are noted as such. Values for timestamps associated with other cache slots may be non-zero values although blanks are included in the examples in FIGS. 10 and 11. In connection with performing cut processing, it should also be noted that cut processing is performed with respect to those cache slots denoted as part of the sequential stream with a valid POS 204 value. As such, an embodiment may also start the sequential stream POS 204 values beginning with track 3 for the first track of prefetched data so that cut processing is performed with respect to tracks starting with track 3.

In connection with performing cut processing associated with the READ HIT to track 6, the FA determines that the end position of the cut as:

POS204 for track 8−X=8−4=4.

The FA sets the timestamps of cache slots for tracks 1-4 to be zero. Because the PF flags of tracks 1-4 are off (=0), the FA determines a used counter value of 4. In this example, the FA instructs the DA to prefetch additional data with a second prefetch request for tracks 9-14. The amount of data to prefetch is as stored in the cache slot header for track 6, the READ HIT cache slot. The FA instructs the DA to store the used counter value of 4 as the USED 212 values for the second prefetched tracks 9-14 in a second prefetch request. Additionally as described elsewhere herein in more detail, the FA may instruct the DA to use other information (e.g., such as values for missed 214) from the cache slot header for track 6 in connection with initializing the cache slot headers of the prefetched tracks 7-9.

The SSID stored in the prefetched tracks 9-14 (PF request 2) is ID1 as associated with the current sequential stream and propagated in subsequent tracks in the same sequential stream The FA may then receive a read request for track 7 and then another read request for track 8. Both read requests result in a READ HIT. As with track 6 READ HIT processing, cut processing may be performed for both tracks 7 and 8. In this instance, the cut processing for tracks 7 and 8 will not result in any additional cache slots having their respective time stamps initialized to 0. In this instance for tracks 7 and 8, processing may be performed which examines the TS value associated with the cache slot for track 4. If the TS for the cache slot containing track 4=0, processing determines that prior cut processing has already processed cache slots containing track 4 and previous data tracks of the sequential stream.

FIG. 11 illustrates the table 1200 updated after processing the two read requests for tracks 7-8. As part of processing track 7, another prefetch request for tracks 9-14 is made from the FA to the DA communicating no change in the used counter. As part of processing track 8, another prefetch request for tracks 9-14 is made from the FA to the DA communicating no change in the used counter. The DA may perform merge processing to merge the multiple prefetch requests for the same tracks 9-14 (e.g., merge the three prefetch requests associated with READ HITS to tracks 6, 7, and 8 if all three prefetch requests are pending). The merge may be done before or after retrieving data for tracks 9-14. As part of this merging, the DA combines the foregoing multiple prefetch requests for the same tracks 9-14 into a single prefetch request with a used count value of 4. Element 1202 indicates the used count values stored in the cache headers of the prefetched tracks 9-14. Element 1206 indicates the modified prefetch flags set to off as part of READ HIT processing for tracks 7 and 8. In this example, the table 1100 of FIG. 10 is the same as table 1200 of FIG. 11 except for the prefetch indicators of element 1206. Element 1204 indicates those timestamp values (TS values) set to 0 when performing cut processing associated with the READ HIT to track 6 as described above.

FIG. 11 illustrates the state of information as may be stored in cache slot headers of prefetched cache slots for tracks 9-14 with the merging of multiple prefetch requests and that the prefetch request for tracks 9-14 is serviced by the DA without having a long or short miss occur. Now, consider a further illustration and variation if a read request is then received for track 9 prior to the DA prefetching tracks 9-14. In connection with this example, the read request for track 9 results in a READ MISS since the DA has not yet completed the prefetch request for tracks 9-14. There is pending a prefetch request for tracks 9-14 in which the FA has instructed the DA to store values in the cache slot headers of tracks 9-14 based on the cache slot header information associated with track 6 (e.g., MISS count=0). The FA performs processing and determines that the previous track 8 is in cache and recognizes that tracks 8 and 9 are part of a sequential stream. The FA then makes a determination as to whether the READ MISS for track 9 is associated with a new stream or an existing stream. In this example, the FA determines that the READ MISS for track 9 is part of the same stream as track 8. More specifically, the device for the track 9 READ MISS is the same as the device in the SSID of the cache slot header for track 8, and the time value for track 9 READ MISS is within a threshold amount of the time value in the SSID for track 8. Additionally, track 8 is found to be in cache and has a POS 204 value further indicating track 8 is part of an existing stream. As such, the FA issues a request to the DA to retrieve track 9 using the information based on the cache slot header associated with track 8 and incrementing the missed count by 1 to account for the current miss for track 9. The request for track 9 is based on the host request causing the READ MISS. As such, there will now be pending for service by the DA the prefetch request for prefetching tracks 9-14 and the subsequently received host request for track 9. In one embodiment as described herein, the DA may detect a short miss upon servicing the prefetch request since the prefetch request was issued prior to the pending host request. Using information of the missed count value as may be associated with the prefetch request (MISSED=0), the DA may update the missed count value 214 associated with track 9 by 1 as indicated in the host request for track 9 (e.g., updated miss count total of 1 by increasing missed count associated with track 8 "+1" for the current short miss). In connection with a READ MISS to track 9 resulting in a short miss, the information in the table 1200 may be updated to have the MISSED 214 value=1 for prefetched tracks 9-14.

Processing steps as described herein that may be performed in an embodiment will be summarized below in connection with flowcharts.

Figure 12:
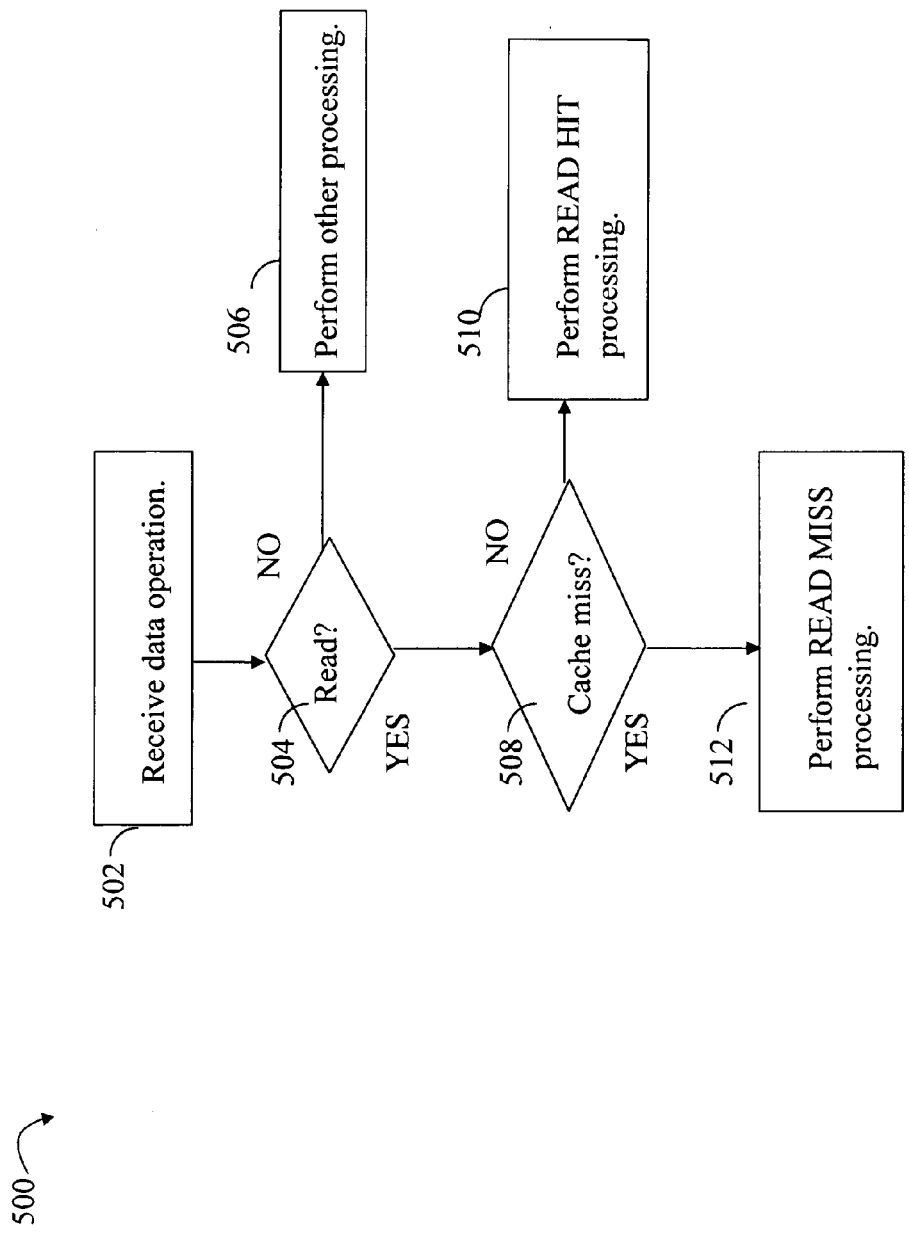
FIGS. 12, 13, 14A and 14B are flowcharts summarizing processing that may be performed in an embodiment in connection with the techniques described herein for sequential stream recognition and prefetch processing.

Referring to FIG. 12, shown is a flowchart of processing steps that may be performed by the FA in connection with processing a received data operation. At step 502, a data operation may be received at the data storage system. The data operation may be received from a host connected to the data storage system. At step 504, a determination is made by the FA as to whether the data operation is a read I/O operation. If not, control proceeds to step 506 to perform other processing of the data operation. In connection with step 506, the FA as well as other components of the data storage system may perform processing to service the data operation. If step 504 evaluates to yes, control proceeds to step 508 where the FA makes a determination as to whether there is a cache miss for the read operation (e.g., READ MISS detected). As described above, step 508 may be determined by examining the one or more in-cache flags of the appropriate one or more entries in the track id table and, for each such entry associated with a cache slot, bitmap information indicating which data is stored in the cache slot. Using such information, a determination can be made as to whether all of the requested data of the read operation is in cache. If step 508 evaluates to no (e.g., all data of read is in cache resulting in a READ HIT), control proceeds to step 510 to perform READ HIT processing. If step 508 evaluates to yes (e.g., all data of read is not currently in cache resulting in a READ MISS), control proceeds to step 512 to perform READ MISS processing. READ HIT and READ MISS processing of, respectively, steps 510 and 512 are described in following figures. As previously described, if any data needed to service the read request is not stored in cache, there is a READ MISS. Otherwise, there is a READ HIT.

Figure 13:
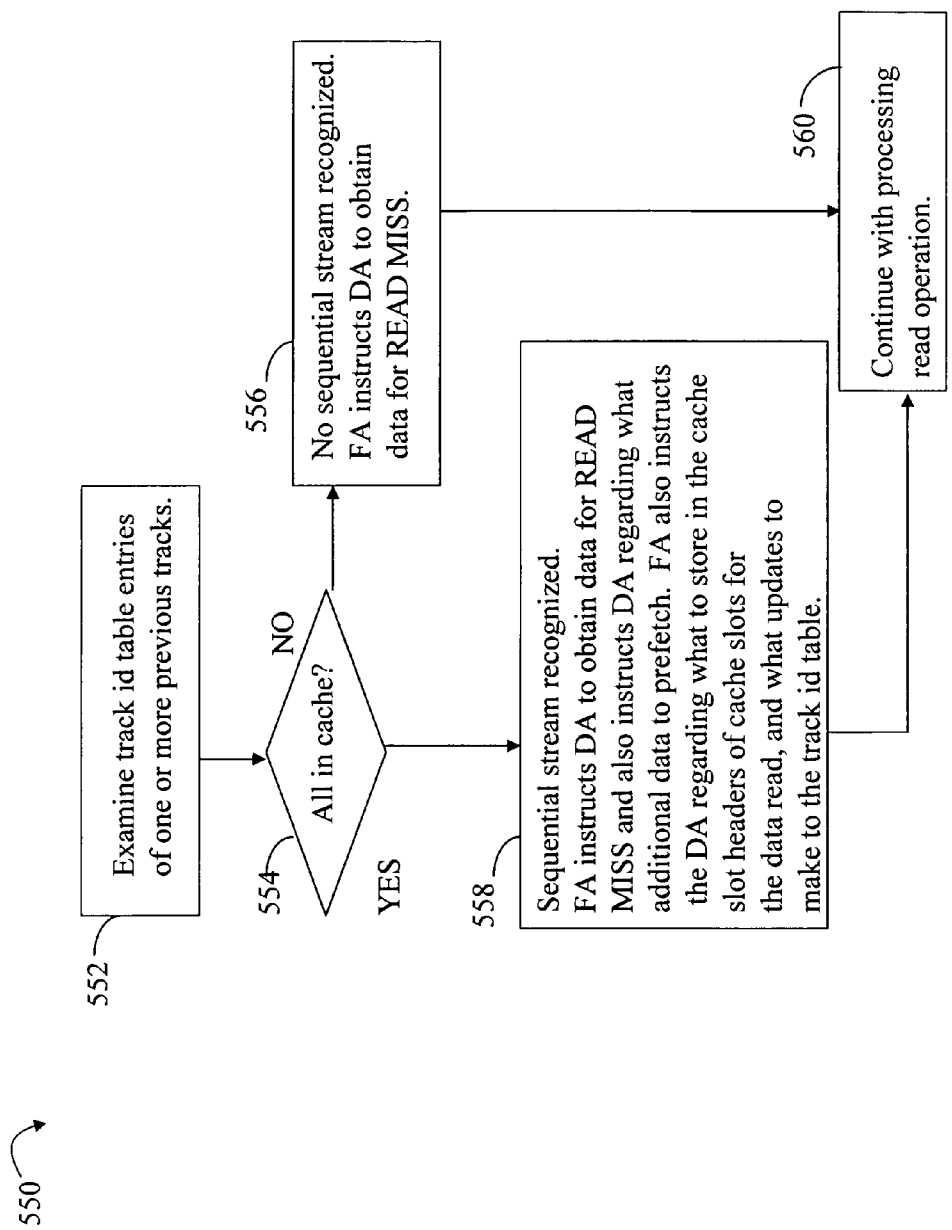

Referring to FIG. 13, shown is a flowchart 550 of processing steps that may be performed in an embodiment in connection with READ MISS processing. Flowchart 550 provides additional detail regarding step 512 of FIG. 12. At step 552, track id table entries associated with one or more data tracks prior to the data of the READ MISS are examined by the FA to determine whether all of the one or more prior data tracks are in cache. It should be noted that in connection with processing of FIG. 13 and other processing steps described herein, the determination of whether a data track is in cache may be made using a variety of different techniques. As described herein, the number of prior tracks examined in step 552 may vary with embodiment in accordance with the number of data tracks to be examined as part of recognizing a sequential stream. If the READ MISS is in connection with a read request spanning multiple tracks, the one or more previous tracks examined in step 552 may be determined with respect to the first or starting track of the data request. At step 554, a determination is made by the FA as to whether all of the previous one or more data tracks from step 552 are in cache. If step 554 evaluates to no, control proceeds to step 556 where the FA makes a determination that no sequential stream is recognized. As part of step 556, the FA instructs the DA to obtain the data for the READ MISS (e.g., data for the read operation determined not to be in cache) from the physical drive(s) or device(s) and store such data in cache. Control proceeds to step 560 where processing in connection with the READ operation continues. If step 554 evaluates to yes, control proceeds to step 558 where the FA may make a determination that a sequential stream is recognized. As part of step 558, the FA makes a determination as described herein as to whether the data causing the READ MISS is associated with a new sequential stream or a continuation of an existing sequential stream. This affects the values which the FA instructs the DA to store in the cache slot headers of the READ MISS data and the prefetched data. As part of step 558, the FA provides instructions to the DA regarding what data to read from the drives or devices, what to store in the cache slot headers for the data read, and what updates to make to the track id table. As described above, the FA may instruct the DA to read the data causing the READ MISS and also prefetch one or more data tracks. In turn the DA, as part of its processing, obtains the cache slots, stores the retrieved data tracks requested in the cache slots, and performs processing associated with initializing the cache slots. The FA may also instruct the DA to store information to the cache slot headers of the data read (e.g., such as the prefetched data tracks). This information stored may be used by the FA in connection with subsequent processing when determining whether to prefetch additional data, and/or how much to prefetch, in response to a subsequent READ HIT to a cache slot having its prefetch indicator set. The FA may also instruct the DA to update the track id table entries of the prefetched data so that the prefetch indicators of such entries are set or on. From step 358, control proceeds to step 360.

In connection with step 558, if the READ MISS is included in a new stream and is not a continuation of an existing sequential stream, the FA instructs the DA to obtain the data causing the READ MISS, prefetch a number of data tracks, and store information in the cache slot headers of the foregoing. When beginning a new stream, the SSID for the new stream may be based on the device and time value for the READ MISS. Values for the position in sequential stream 204 are determined for a new stream and assigned accordingly to the different data tracks of the prefetched data and, possibly the READ MISS data track and one or more tracks prior to the READ MISS DATA depending in the embodiment. The FA may instruct the DA to appropriately store information in the cache slots headers as described in more detail elsewhere herein.

In connection with step 558, if the READ MISS is a continuation of an existing sequential stream and the FA tells the DA to fetch the READ MISS data. The FA may or may not tell the DA to prefetch any more data depending on the embodiment. In one embodiment, the FA may use cache slot header information from the track prior to the READ MISS in instructing the DA as to what is stored in the cache slot headers for the READ MISS track and any prefetched data tracks. As described elsewhere herein, some of the information in the cache slot header of the track prior to the READ MISS data may be propagated forward to the cache slot headers of subsequently retrieved data of the same stream (e.g., the SSID). Some of the information in the foregoing cache slot header may serve a starting point for determining information included in the cache slot headers of subsequently retrieved data of the same stream (e.g., the position in sequential stream 204). In one embodiment, the SSID and used counter value of the track prior to the READ MISS data may be stored in the cache slot headers for the READ MISS data and prefetched data. In connection with short and long misses, the DA may update information in the cache slot header of a track retrieved in connection with the READ MISS using information contained in a prefetch request for the same track. The existing stream has a next position in sequential number 204 for the READ MISS and prefetched data tracks continuing with the next position number determined from the value for 204 associated with the track prior to READ MISS data. In an embodiment in which each track of a received I/O operation is processed separately, the missed counter included in the cache slot headers for the READ MISS and prefetched data may be the sum of the missed counter from the track prior to the READ MISS "+1". It should be noted that if the I/O operation spans multiple tracks and all tracks associated with the I/O operation are processed as a unit, READ MISS may be incremented by a quantity other than 1 representing the number of "missed" tracks not in cache for the I/O operation. In an embodiment in which each track of a received I/O operation spanning multiple tracks is not processed separately but rather all tracks associated with the I/O operation are processed as a unit, the number of missing tracks for the READ MISS (e.g., the entire I/O operation) may be handled in a variety of different ways. In a first case, the number of missed may be reflect all tracks associated with the READ MISS operation if any one or more tracks of the I/O operation are not in cache. As a second case, the number of missed may reflect only the number of tracks associated with the READ MISS which are not in cache. The FA may accordingly update, or otherwise instruct the DA to update, any cache slot headers accordingly depending how an embodiment counts a number of misses and performs processing for I/O requests spanning multiple tracks.

Figure 14A:
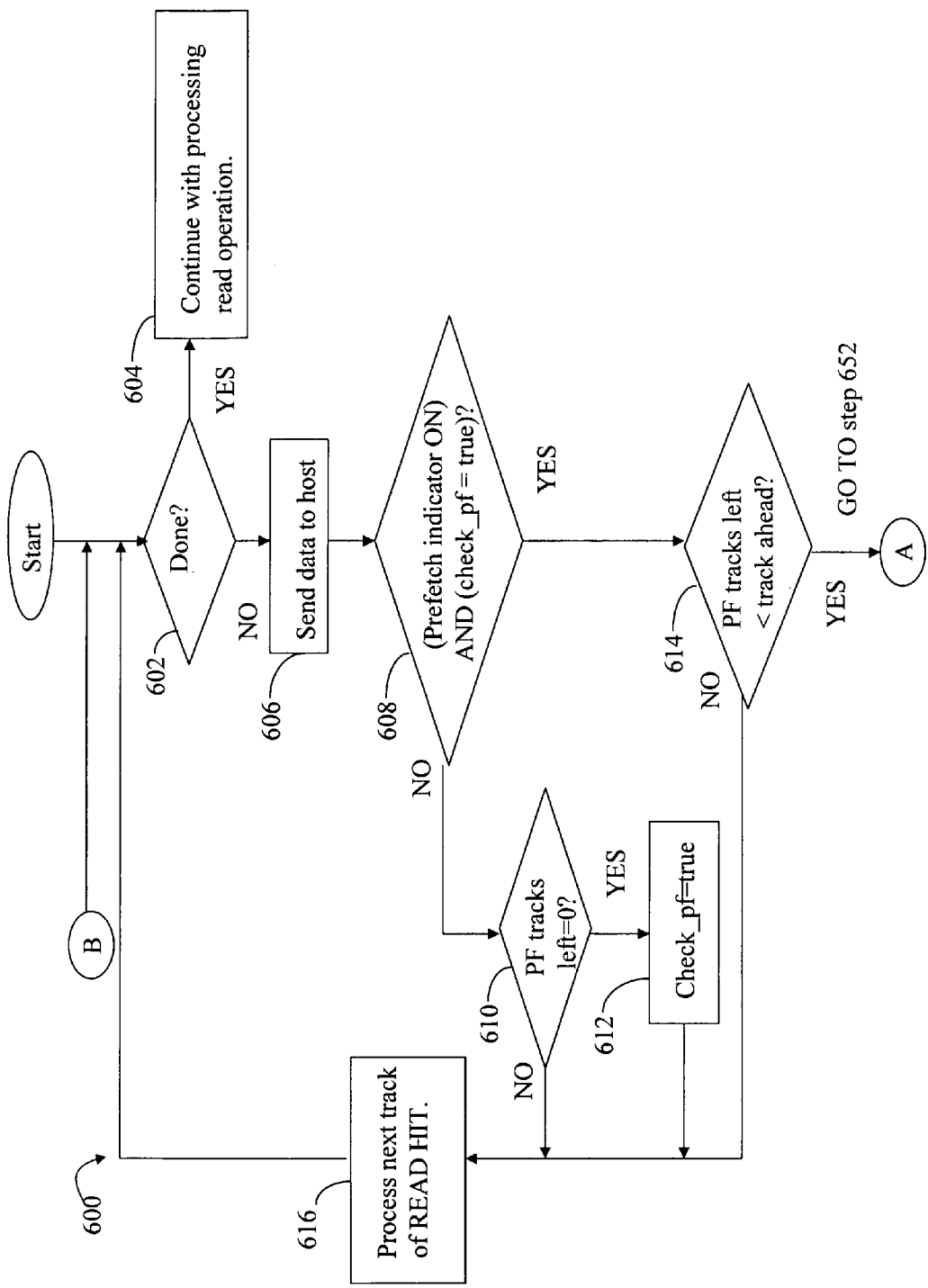
Figure 14B:
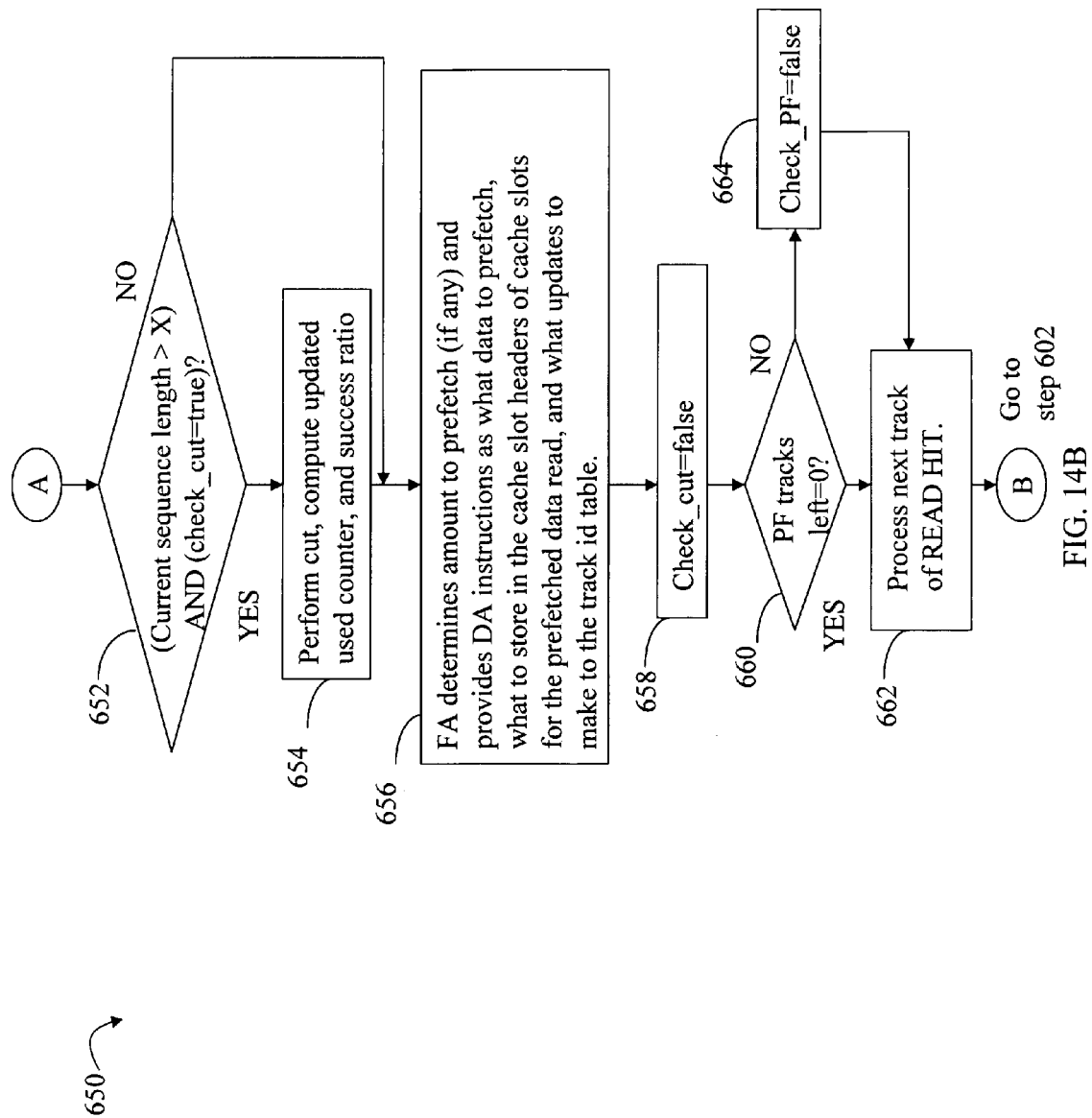

Referring to FIGS. 14A and 14B, shown are flowcharts of processing steps that may be performed in an embodiment in connection with READ HIT processing. Flowcharts of FIGS. 14A and 14B provide additional detail regarding step 510 of FIG. 12. In an embodiment using the foregoing flowcharts, a READ HIT spanning multiple tracks may be processed one track at a time. A first variable, check_cut, is used in processing steps to ensure that at most one cut is performed for each I/O operation. A variable, check_pf, is used in processing steps to avoid having the FA issue multiple prefetch requests for the same set of data as may occur when there are read hits to multiple tracks in the same previously prefetched chunk. As described elsewhere herein, a "chunk" refers to a set of one or more tracks of data included in a single prefetch request for a number of tracks as may be indicated by a value of 210 included in a cache slot header. Check_pf is also used to allow for the possibility of the FA issuing multiple prefetch requests for different sets of data as may occur when there are read hits to multiple tracks included in different previously prefetched chunks The two variables, check_pf and check_cut, are initially set to true at the beginning of processing each new I/O operation in connection with FIGS. 14A and 14B.

At step 602, a determination is made as to whether processing is complete for all tracks of the current READ HIT operation have been processed. If so, control proceeds to step 604 to continue processing for the current read operation. Otherwise, if step 602 evaluates to no indicating that all tracks for the READ HIT have not been processed, control then proceeds to step 606. At step 606, the current track of data is returned to the host. At step 608, a determination is made by the FA as to whether the prefetch indicator for the current data track associated with the READ HIT is on and also whether the variable check_pf is true. If step 608 evaluates to no, control proceeds to step 610 where a determination is made as to whether the number of remaining prefetched data portions (e.g., PF tracks left)=0. If step 610 evaluates to yes, control proceeds to step 612 where check_pf is set to true. Control then proceeds to step 616 to process the next track of the READ HIT. If step 610 evaluates to no, control proceeds directly to step 616. From step 616, processing continues with step 602 using the next track, if any, associated with the READ HIT. As described elsewhere herein, processing may be performed for each track associated with the READ HIT one track at a time until all the one or more tracks associated with the READ HIT are processed. Additionally, using the variable check_pf, the FA may also avoid issuing multiple prefetch requests for the same set of data when there are read hits to multiple tracks of the same previously fetched chunk.

If step 608 evaluates to yes for the current track, control proceeds to step 614 where a determination is made as to whether the number of remaining prefetched data portions (e.g., PF tracks left)<track ahead. Values used for step 614 are retrieved from the cache slot header of the current READ HIT track being processed. If step 614 evaluates to no, control proceeds to step 616. If step 614 evaluates to yes, control proceeds to step 652 where a determination is made as to whether the variable check_cut is true and also whether the current sequence length is greater than X, the number of tracks associated with the sequential stream to remain in cache or which do not have their associated time stamps set to 0. Step 652 is performed in connection with determining whether to perform cut processing in this iteration of READ HIT processing for the current track. The current sequence length may be determined by the value of the position in sequential stream 204 included in the cache slot header of the current track. If step 652 evaluates to no control proceeds to step 656. If step 652 evaluates to yes, control proceeds to step 654 to perform cut processing, compute the updated used counter and a success ratio. From step 654, control proceeds to step 656. At step 656, the FA instructs the DA as to what one or more additional data tracks to prefetch (if any), what information should be stored in the cache slot headers of the cache slots including the prefetched data, and what updates to make to the track id table. Described elsewhere herein are examples illustrating the information stored in the cache slot header of each prefetched data track. Such information may be used in connection with subsequent READ HITs to cache slots including the prefetched data (e.g, subsequent processing of step 656). As part of step 656 processing, the FA may also instruct the DA to set the prefetch indicator of the cache slot associated with the current track of the READ HIT to off or false. Alternatively, the FA may also set the prefetch indicator rather than instruct the DA to do so. The FA may also instruct the DA to update the track id table entries of the prefetched data tracks so that the prefetch indicators of such entries are set or on. The FA may use information previously stored in the cache slot header of the current cache slot associated with the READ HIT to determine whether to perform any prefetching and, if so, how much data to prefetch. Such information may have been previously stored to the cache slot and may also be updated at various other times by the FA, DA or other components of the data storage system. The particular information stored, when it may be updated, and how it may be used varies with embodiment and examples are described herein. In connection with step 656, the FA may instruct the DA to also update other cache slot headers associated with data the FA instructs the DA to obtain. The particular cache slot headers updated, the information recorded, and the like, may vary with the embodiment and technique used in sequential stream recognition processing and making a determination about an amount of data, if any, to be prefetched. From step 656, control proceeds to step 658 where the variable check_cut is set to false. At step 660, a determination is made as to whether the number of prefetched tracks remaining is 0. Note that the number of prefetched tracks remaining may be indicated by the value of 206 in the cache slot header associated with the track currently being processed. If step 660 evaluates to no, check_pf is set to false and control proceeds to step 662 to continue processing with the next track, if any, of the READ HIT. If step 660 evaluates to yes, control proceeds directly to step 662. From step 662, control proceeds to step 602.

It should be noted that in an embodiment, the prefetch indicator of the cache slot associated with the current track of the READ HIT may also be set to off or false in connection with other processing steps then step 656 and at other points in connection with processing the READ HIT. For example, an embodiment may also set the foregoing prefetch indicator to off or false between steps 608 and 614.

When making a determination in connection with step 656 as to how much data, if any, to prefetch, information from the cache slot header of the READ HIT track currently being processed may be used as described in more detail elsewhere herein. Additionally, if the success ratio from step 654 is determined, the success ratio may be one of the inputs used in determining an amount of additional data to be prefetched, if any. Additionally, as described elsewhere herein, the success ratio, alone or in combination with other information, may be used in revising or adjusting the values for track ahead and/or amount of data to prefetch on this iteration of READ HIT processing as well as in determining such revised values stored in cache slot headers of any prefetched data portions.

An embodiment may include variations to the foregoing in connection with the techniques described herein for I/O operations spanning multiple tracks. As described above with reference to FIG. 12 for a multiple track I/O operation, a determination regarding whether to perform READ HIT processing (e.g., FIGS. 14A and 14B) or READ MISS processing (e.g., FIG. 13) may be made by examining all tracks in connection with the I/O operation as a single unit so that if all the data is not in cache needed for the I/O operation, READ MISS processing may be performed; otherwise READ HIT processing may be performed.

As a first alternative to the foregoing involving I/O operations spanning multiple tracks, an embodiment may process each track of the I/O operation spanning multiple tracks separately. In other words, no matter how many tracks there are in connection with the I/O operation, a determination as to whether READ HIT or READ MISS processing is performed is made with respect to each individual track of the I/O operation so that an I/O operation involving "m" data tracks may be processed as "m" individual I/O operations each involving a different one of the "m" tracks. As an example, consider an I/O operation involving 2 tracks of data wherein the first track of data of the I/O operation is in cache and second track is not. Using the first alternative, READ HIT processing may be performed for the first track and the second track is processed separately in accordance with the flowchart, for example, of FIG. 12. Processing of the second track may result in READ MISS processing.

As a second alternative to the foregoing involving I/O operations spanning multiple tracks, an I/O operation spanning multiple tracks may be examined to determine whether all the data needed to service the I/O operation is in cache. If so, READ HIT processing may be performed as described herein, for example, with reference to FIGS. 12, 14A and 14B and description above. If a READ MISS is determined (e.g., not all the data needed to service the I/O operation is in cache), an embodiment may use one or more criteria to determine whether to process the I/O operation as a single READ MISS or whether to process each track of the I/O operation spanning multiple tracks separately (e.g., an I/O operation involving "m" data tracks may be processed as "m" individual I/O operations each involving a different one of the "m" tracks), or whether to process groups of tracks (e.g., two or more) as separate I/Os. Such criteria may include, for example, whether any of the data tracks associated with the READ MISS are in cache and whether a prefetch indicator for any one of these in-cache tracks is ON. As an example in one embodiment, each track of the READ MISS operation may be processed separately if any one track is in cache and has its prefetch indicator ON.

The foregoing describes an efficient and flexible technique that may be performed by the FA where the FA performs sequential stream recognition processing upon the occurrence of a READ MISS and decides how much data to initially prefetch. The FA provides instructions to the DA including instructions to read the READ MISS data (e.g., data causing the READ MISS which is not in cache) and also prefetch one or more additional data tracks representing the next tracks in the detected sequence. Additionally, in an embodiment in which information may be used by the FA to determine whether to prefetch additional data when there is a READ HIT to a prefetched data track (e.g., prefetch indicator is set), the FA may provide instructions to the DA to store information in the cache slot header of the cache slot associated with a prefetched data track. Due to the logical device information available to the FA, the FA is able to perform sequential stream recognition processing and prefetch processing for both regular and non-regular devices. An example illustrating use of the techniques herein with a non-regular device is described herein in connection with FIG. 4. It will be appreciated by those skilled in the art that the FA has access to and reads the necessary logical device information for use with non-regular devices. For example, when an FA performs processing of FIGS. 5 and 6, the FA may determine whether a device is a non-regular device by examining the appropriate non-regular device information. The FA may use this information in connection with mapping an I/O request for a non-regular device to the particular LV and track to be read by the DA.

With reference to FIG. 5, it should be noted that an embodiment may have a value for track ahead 208 which is greater than a number of tracks to prefetch 210. In such an embodiment, the value of track ahead may be used in determining what additional data to prefetch upon the occurrence of a READ HIT to a previously prefetched track. Consider an example where the number of tracks to prefetch 210 has a value of 3, track ahead 208 has a value of 9, and tracks 1-3 are currently in cache with a READ HIT to track 1. In determining what additional data to prefetch, the FA may determine an ending position in the sequence for the last track in the additional prefetched chunk as 12 by adding 9 (the value of track ahead 208) to 3 (e.g., the last prefetched track's position in the sequential stream 204). The value of 12 is determined as the last track in the prefetched chunk for which the FA may issue a prefetch request in response to the READ HIT to track 1. With the number of tracks to prefetch 210 having a value of 3, the position in the sequential stream for the first track of the prefetched chunk is 10 (e.g., (12−3)+1)) so that the FA may issue a prefetch request for tracks 10-12. The additional data prefetched may be determined based on the value of track ahead as just described. An embodiment may use the foregoing technique to generally determine what data to prefetch when there is a READ HIT to a previously prefetched track of data. At the start of the sequential stream as described above, an embodiment may also prefetch the intervening tracks 4-9. An embodiment may alternatively wait until there is a read request for one of tracks 4-9 resulting in a READ MISS so that there is a request to retrieve the READ MISS data as well as prefetch an additional chunk (e.g., of size 3 in this case) depending on which track is requested. Upon the occurrence of a READ MISS to a track, processing may be performed to see whether one or more tracks adjacent to (e.g., before and/or after) the READ MISS track are in cache and, if in cache, whether the adjacent tracks are part of an existing sequence (e.g., determined by examining the cache slot header information for the adjacent tracks if in cache). For example, as described elsewhere herein, an embodiment may determine whether one or more tracks immediately preceding the READ MISS track are in cache and part of an existing sequence. If the one or more adjacent tracks are in cache and part of an existing sequence, processing may be performed to prefetch additional tracks. The data retrieved for the READ MISS as well as the prefetched additional tracks may be considered as part of the existing sequence (e.g., a resumption of the existing sequence) as indicated by the adjacent tracks.

In an embodiment in which the value for track ahead 208 is greater than the number of tracks to prefetch 210, techniques may be used to identify patterns which are based on the sequential I/O stream with an intervening gap. If such a gap is detected upon the occurrence of a READ HIT to a prefetched cache slot, subsequently prefetched data may be based on a next expected gap location. The gap may occur in connection with requested tracks of data in the sequential I/O stream. An embodiment may use the value of track ahead 208 to determine what additional data to prefetch upon the occurrence of a READ HIT to a prefetched cache slot when there is a gap in the requested tracks of the sequential I/O stream rather than use the value of track ahead 208 to determine what data to prefetch in the general case (e.g., without regard to whether there is a gap) as described above. Consider an example in which the number of tracks to prefetch (210) has a value of 4, the value for track ahead (208) is 12, and tracks 1-16 are currently in cache with a READ HIT to track 8. The track numbers are the same as the position in the sequential stream numbers (204) of each track for illustration. Additional data in tracks 17-20 may be prefetched. A next READ HIT may occur to track 18 included in a prefetched slot. The READ HIT to track 18 results in a gap of prefetched tracks 9-17 in the I/O stream being skipped over. The FA may perform processing to detect such a gap in connection with READ HIT processing and determine a next series of 4 tracks to prefetch in accordance with such a detected gap. In this example, the FA may request to prefetch a chunk of 4 tracks containing tracks 29-32, inclusively. The FA may determine an ending position in the sequence for the last track in the prefetched chunk as 32 by adding 12 (the value of track ahead 208) to 20 (e.g., the last prefetched track's position in the sequential stream 204). The value of 32 is determined as the last track in the prefetched chunk. With the number of tracks to prefetch (210) having a value of 4, the position in the sequential stream for the first track of the prefetch chunk is 29 (e.g., (32−4)+1).

In the foregoing, the determination regarding what data to prefetch upon the occurrence of a READ HIT to a prefetched track may be made with respect to the last track of the prefetched "chunk" including the prefetched track experiencing the READ HIT as described above. An embodiment may also make such a determination with respect to the first track of the prefetched chunk including the prefetched track experiencing the READ HIT.

In an embodiment where a value of 208 is greater than a value of 210, gaps may occur in connection with what data is prefetched as described above. In such cases, the cache slot header of one or more of particular cache slots may not include up to date information or all information used in an embodiment in determining values for used 212, missed 214, and/or the associated used and missed ratios. In such cases, the calculation of the used and miss ratios may need to determined in a manner different from that as described above. For example, an embodiment may use additional information in determining the used and missed ratios. Such additional information may be stored in global memory, and/or as one or more additional parameters stored in the cache slot header.

In connection with the techniques herein where an additional amount of data may be prefetched upon a READ HIT to a prefetched slot, the FA may perform processing to detect the occurrence of the forgoing and also determine how much additional data to prefetch, if any, for the current sequential stream.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable. This is illustrated in more detail in following figures.

Figure 15:
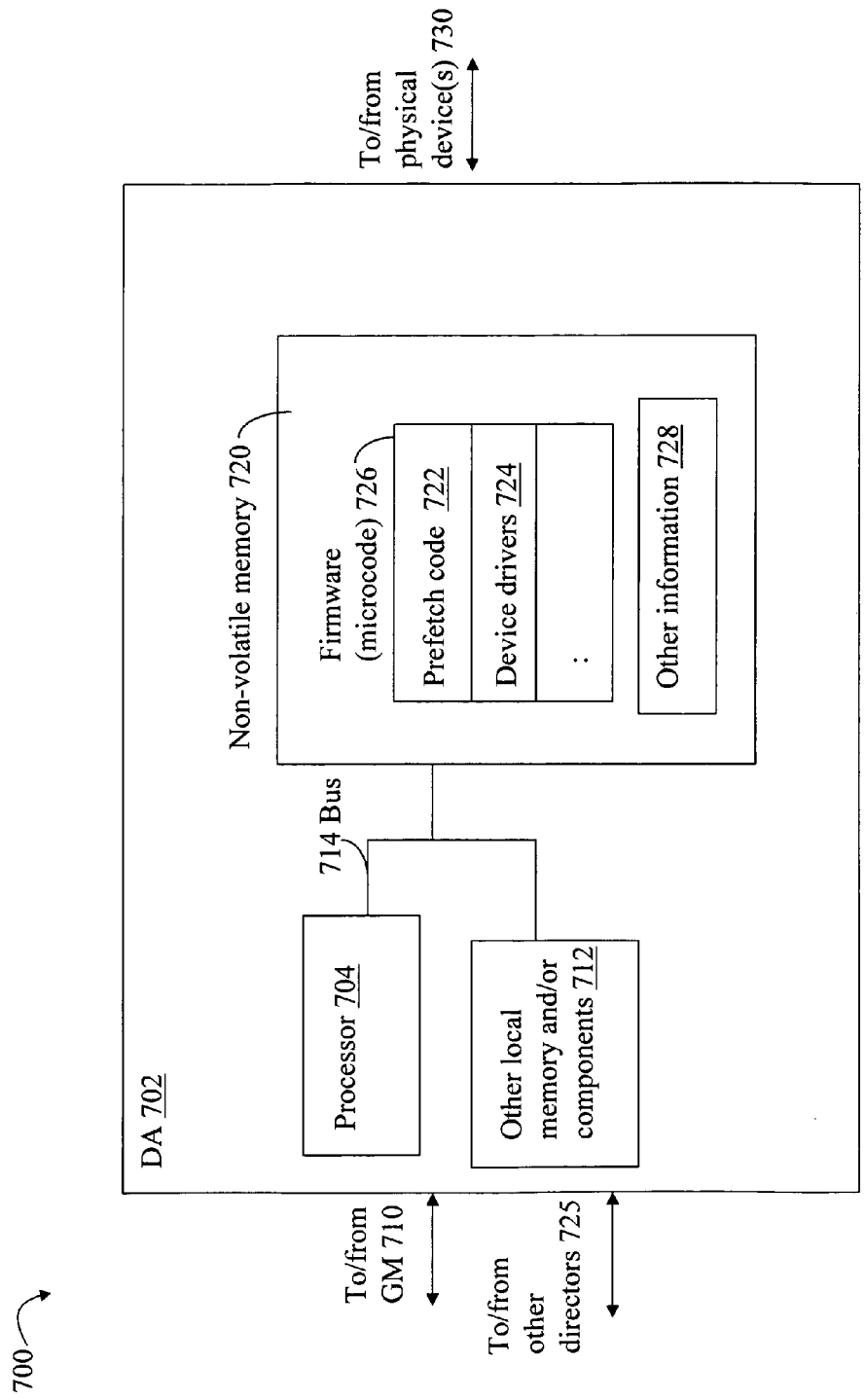
FIGS. 15 and 16 are more detailed examples of directors that may be included in an embodiment using the techniques herein.

Referring to FIG. 15, shown is an example illustrating a DA in more detail as may be included in an embodiment using the techniques herein. The example 700 illustrates a DA 702 including a processor 704, non-volatile memory (NVM) 720 and other local memory and/or components 712 which communicate over an internal bus 714. The components included in 702 may be characterized as local to the DA 702. The DA 702 may communicate with the global memory (GM) as illustrated by 710, write/read data to/from the physical devices as illustrated by 730, and communicate with other directors as illustrated by 725. It should be noted an embodiment may include the CM 38 of FIG. 2B and use the CM 38 in connection with communicating with other directors. The NVM 720 may include microcode or firmware 726. The firmware 726 may include prefetch code 722, device drivers 724, and other code used by the DA. The prefetch code 722 may include code for performing the processing described herein by the DA. The NVM 720 may also include other information 728, such as code and/or data used by the DA.

Figure 16:
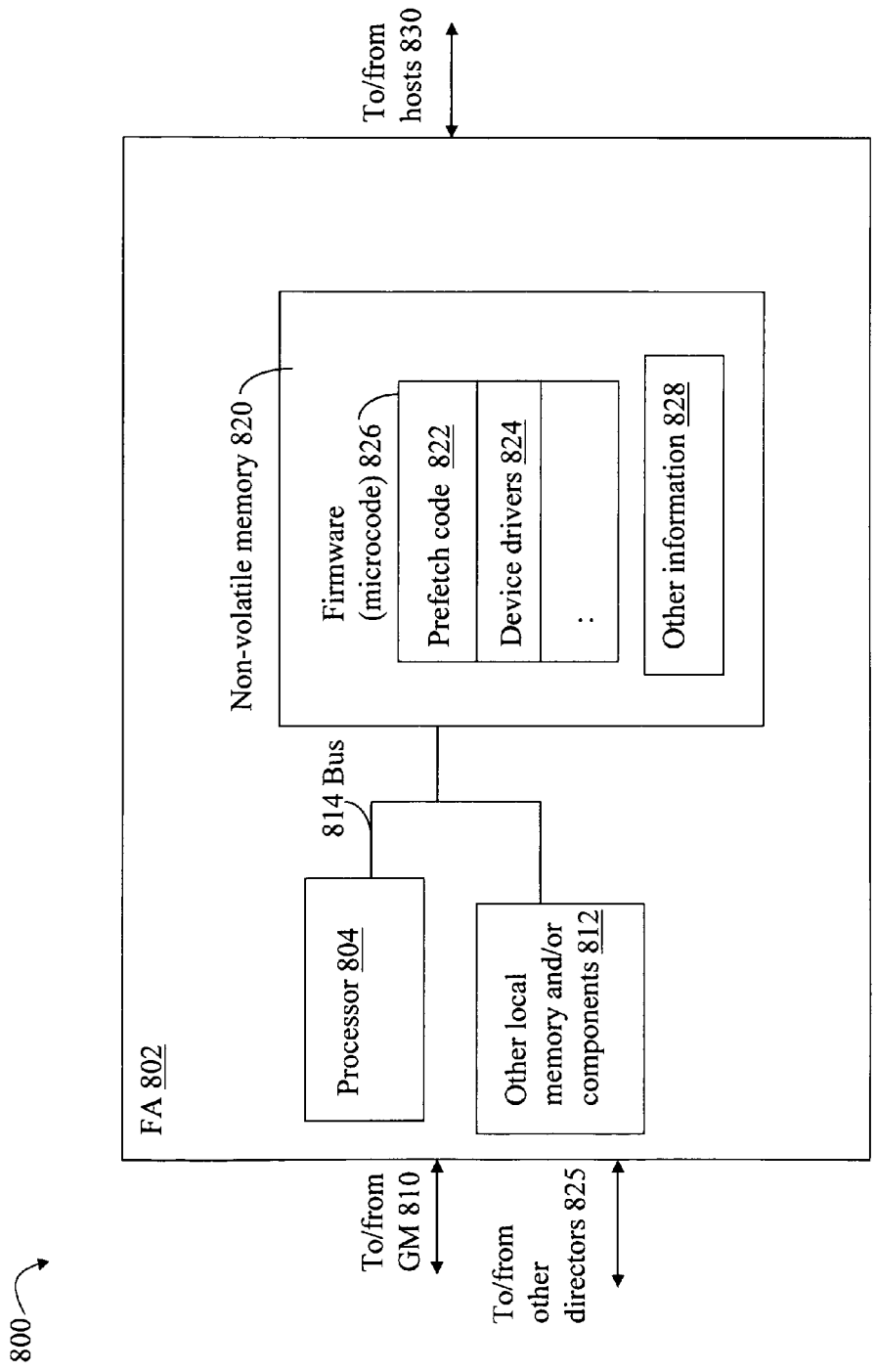

Referring to FIG. 16, shown is an example illustrating a FA in more detail as may be included in an embodiment using the techniques herein. The example 800 illustrates a FA 802 including a processor 804, non-volatile memory (NVM) 820 and other local memory and/or components 812 which communicate over an internal bus 814. The components included in 802 may be characterized as local to the FA 802. The FA 802 may communicate with the global memory (GM) as illustrated by 810, communicate with the host as illustrated by 830, and communicate with other directors as illustrated by 825. It should be noted an embodiment may include the CM 38 of FIG. 2B and use the CM 38 in connection with communicating with other directors. The NVM 820 may include microcode or firmware 826. The firmware 826 may include prefetch code 822, device drivers 824, and other code used by the FA. The prefetch code 822 may include code for performing the processing described herein by the FA. The NVM 820 may also include other information 828, such as code and/or data used by the FA.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing a data operation in a data storage system comprising:
   receiving, by a front-end component of the data storage system, the data operation to read a data portion; and
   in response to receiving the data operation, performing first processing by the front-end component, said first processing including:
      determining whether the data operation is a read operation resulting in a cache hit to a prefetched data portion of a sequential stream; and
      if said determining determines that said data operation is a read operation resulting in a cache hit to a prefetched data portion of said sequential stream, performing processing in connection with prefetching additional data for said sequential stream, said processing including determining whether to prefetch additional data for said sequential stream and, if so, an amount of additional data to prefetch, said processing including using criteria to determine an amount of data to prefetch in a single prefetch request and a track ahead parameter, said amount of data to prefetch and said track ahead parameter being associated with said sequential stream, said track ahead parameter indicating a number of data portions prefetch processing should remain ahead of requests to read data associated with the sequential stream, wherein said criteria used in determining said amount of data to prefetch and said track ahead parameter include a current length of the sequential stream as detected by the data storage system in connection with previously received data operations of the sequential stream and a size indicating an amount of data currently requested by the data operation whereby when the current length of the sequential stream is more than a stream size denoting a short sequential sequence, the amount of data to prefetch and the track ahead parameter vary with said size.

2. The method of claim 1, wherein said criteria are used to select an initial value for one or more of said track ahead parameter and said amount of data to prefetch.

3. The method of claim 1, wherein said criteria are used to adjust one or more of said track ahead parameter and said amount of data to prefetch.

4. The method of claim 1, wherein said criteria include a success ratio indicating a portion of prefetched tracks of said sequential stream which have been requested in connection with a data operation subsequent to being prefetched resulting in a cache hit.

5. The method of claim 1, wherein said criteria include a missed ratio indicating a portion of cache misses which have occurred with respect to a number of prefetched data portions in the sequential stream.

6. The method of claim 3, wherein one or more of said track ahead parameter and said amount of data to prefetch are upwardly adjusted, each of said amount of data to prefetch and said track ahead parameter being subject to an upper limit.

7. The method of claim 5, wherein said criteria include a success ratio indicating a portion of prefetched tracks of said sequential stream which have been requested in connection with a data operation subsequent to being prefetched resulting in a cache hit, and wherein one or more of said missed ratio, said size, and said success ratio is used to determine whether to stop prefetching additional data for said sequential stream.

8. The method of claim 7, further comprising:
   determining a first value indicating whether at least one of a plurality of conditions is true, said plurality of conditions including: if said missed ratio is above a maximum value, if said size is above a maximum value, and if said success ratio is less than a specified value;
   determining a second value indicating whether one or more of said amount of data to prefetch and said track ahead parameter are at an upper limit;
   if said first value indicates at least one of said plurality of conditions is true and said second value indicates that one or more of said amount of data to prefetch and said track ahead parameter are at an upper limit, the front end component terminates prefetching for said sequential stream.

9. The method of claim 1, wherein, at least one of said amount of data to prefetch and said track ahead parameter are increased in an amount proportional to said current length of said sequential stream.

10. The method of claim 1, wherein if said current length of said sequential stream is less than said stream size denoting a short sequential sequence, a fixed amount of data is used when prefetching data, and wherein if said sequential stream is larger than said stream size, one or more of said track ahead parameter and said amount of data to prefetch are upwardly adjusted in accordance with said size.

11. The method of claim 1, wherein one or more of said track ahead parameter and said amount of data to prefetch are increased or decreased in accordance with one or more defined ranges, each of said one or more defined ranges specifying a range of values associated with one of said criteria.

12. The method of claim 11, wherein at least one of an upper limit and a lower limit is specified for each of said track ahead parameter and said amount of data to prefetch.

13. The method of claim 1, wherein said track ahead parameter and said amount of data to prefetch are determined using a function, said function using said criteria in selecting and adjusting each of said amount of data to prefetch and said track ahead parameter.

14. The method of claim 1, wherein said criteria relates to configuration of said data storage system.

15. The method of claim 1, wherein at least one of an upper limit, a lower limit, and a default value associated with one of said track ahead parameter or said amount of data to prefetch is determined in accordance with said criteria.

16. The method of claim 5, wherein said sequential stream has a first quality of service level, and said amount of data to prefetch is selected in accordance with said missed ratio for the sequential stream, a measure of utilization for one or more resources of the data storage system, and a missed ratio associated with another activity having, a second quality of service level indicating a higher service priority than said first quality of service level, wherein the sequential stream and said another activity share at least one resource in the data storage system, said another activity being one of a plurality of activity types including another sequential stream.

17. A data storage system including a non-transitory computer readable medium with code stored thereon for processing a data operation in the data storage system, the non-transitory computer readable medium comprising code for:
  receiving, by a front-end component of the data storage system, the data operation to read a data portion; and
  in response to receiving the data operation, performing first processing by the front-end component, said first processing including:
    determining whether the data operation is a read operation resulting in a cache hit to a prefetched data portion of a sequential stream; and
    if said determining determines that said data operation is a read operation resulting in a cache hit to a prefetched data portion of said sequential stream, performing processing in connection with prefetching additional data for said sequential stream, said processing including determining whether to prefetch additional data for said sequential stream and, if so, an amount of additional data to prefetch, said processing including using criteria to determine an amount of data to prefetch in a single prefetch request and a track ahead parameter, said amount of data to prefetch and said track ahead parameter being associated with said sequential stream, said track, ahead parameter indicating a number of data portions prefetch processing should remain ahead of requests to read data associated with the sequential stream, wherein said criteria used in determining said amount of data to prefetch and said track ahead parameter include a current length of the sequential stream as detected by the data storage system in connection with previously received data operations of the sequential stream and a size indicating an amount of data currently requested by the data operation whereby when the current length of the sequential stream is more than a stream size denoting a short sequential sequence, the amount of data to prefetch and the track ahead parameter vary with said size.

* * * * *